United States Patent
Rasmussen et al.

(10) Patent No.: US 11,923,910 B1
(45) Date of Patent: Mar. 5, 2024

(54) CMOS CIRCUIT

(71) Applicant: Acacia Communications, Inc., Maynard, MA (US)

(72) Inventors: Christian Rasmussen, Kongens Lyngby (DK); Ian Dedic, London (GB); Benny Mikkelsen, Newton, MA (US)

(73) Assignee: Acacia Communications, Inc., Maynard, MA (US)

(*) Notice: Subject to any disclaimer, the term of this patent is extended or adjusted under 35 U.S.C. 154(b) by 185 days.

(21) Appl. No.: 17/531,733

(22) Filed: Nov. 20, 2021

Related U.S. Application Data

(60) Provisional application No. 63/116,498, filed on Nov. 20, 2020.

(51) Int. Cl.
| | |
|---|---|
| *H04B 10/00* | (2013.01) |
| *H04B 1/04* | (2006.01) |
| *H04B 10/556* | (2013.01) |
| *H04B 10/80* | (2013.01) |
| *H04J 14/00* | (2006.01) |

(52) U.S. Cl.
CPC .............. *H04B 10/803* (2013.01); *H04B 1/04* (2013.01); *H04B 10/556* (2013.01); *H04B 2001/0408* (2013.01)

(58) Field of Classification Search
CPC .... H04W 88/08; H04W 88/085; H04W 88/12
See application file for complete search history.

(56) References Cited

U.S. PATENT DOCUMENTS

| | | | |
|---|---|---|---|
| 2019/0373666 A1* | 12/2019 | Khan | G06F 9/45558 |
| 2023/0268651 A1* | 8/2023 | Tran | G06N 20/10 |
| | | | 343/721 |

\* cited by examiner

*Primary Examiner* — Daniel G Dobson
(74) *Attorney, Agent, or Firm* — K&L Gates LLP

(57) ABSTRACT

A CMOS integrated circuit comprising digital-to-analogue converters (DACs), analogue-to-digital converters (ADCs), a digital signal processor (DSP), on-chip switching, an on-chip processor; and logic enabling to receive data from data sources in a 5G network, combine the data from the data sources into a single data stream, encode the single data stream using the DSP, and cause the encoded single data stream to be transmitted to another device in the 5G network.

21 Claims, 15 Drawing Sheets

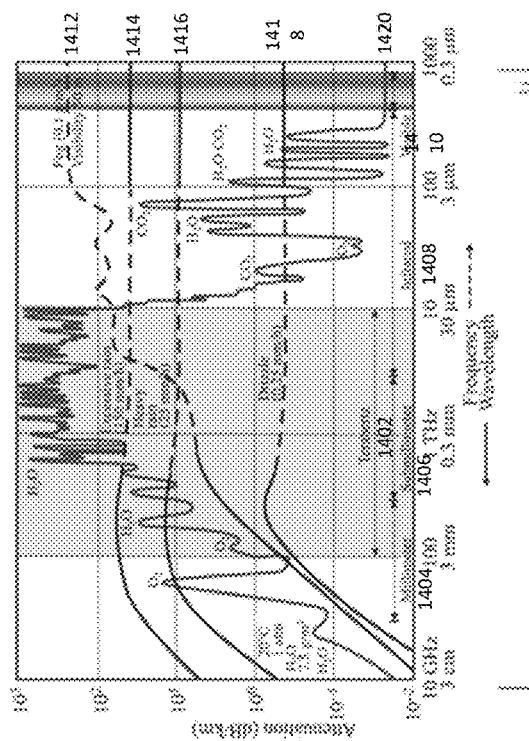

FIG. 14a

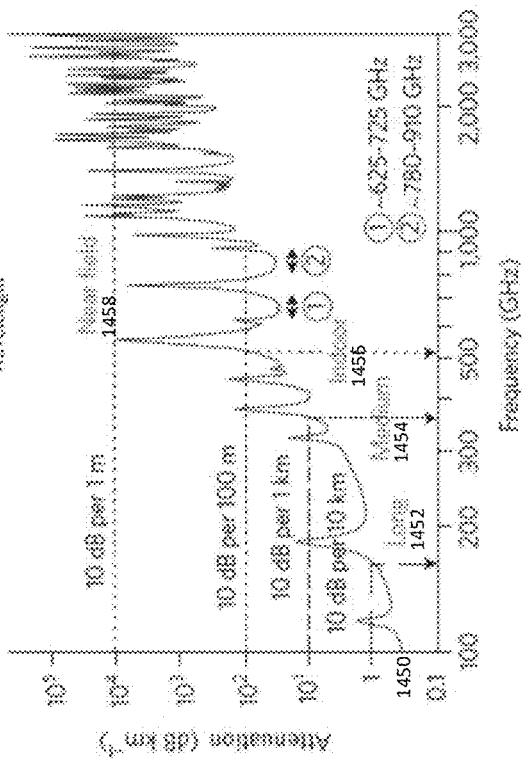

FIG. 14b

Attenuation of THz signals by atmospheric absorption

THz frequency range involves specific THz applications (*see use cases*)

THz band physical properties exhibits limitations (radio coverage) and benefits for spectroscopy/detection ➤ H2O absorption
➤ molecular finger print in the THz band
➤ Get through human skin (cancer detection)
✓ coverage enhancements with reflected *hypersurfaces* [IAC,2018]

US 11,923,910 B1

CMOS CIRCUIT

RELATED APPLICATIONS

The present application claims the benefit under 35 U.S.C. § 119(e) of U.S. Patent Application Ser. No. 63/116,498, filed Nov. 20, 2020 and entitled "CMOS CIRCUIT," which is hereby incorporated herein by reference in its entirety.

TECHNICAL FIELD

The present disclosure relates to network equipment and services.

BACKGROUND

Networking architectures have grown increasingly complex in communications environments, particularly mobile networking environments.

SUMMARY

A CMOS integrated circuit comprising digital-to-analogue converters (DACs), analogue-to-digital converters (ADCs), a digital signal processor (DSP), on-chip switching, an on-chip processor; and logic enabling the CMOS Circuit to receive data from data sources in a 5G network, combine the data from the data sources into a single data stream, encode the single data stream using the DSP, and cause the encoded single data stream to be transmitted to another device in the 5G network.

BRIEF DESCRIPTION OF THE FIGURES

FIG. 14A illustrates Terahertz frequency band properties, according to an embodiment of the current disclosure;

FIG. 14B illustrates Terahertz frequency band properties, according to an embodiment of the current disclosure.

DETAILED DESCRIPTION

Figure 1:
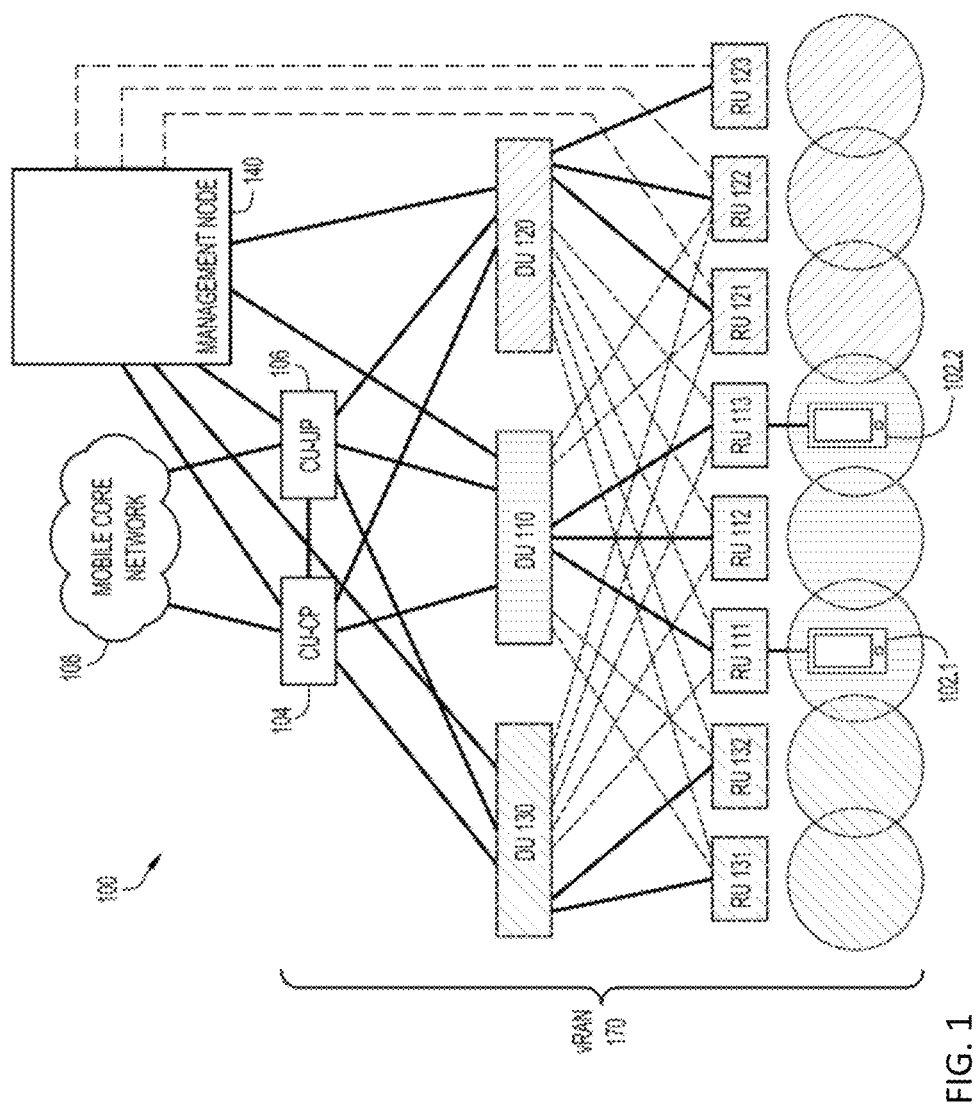
FIG. 1 illustrates a block diagram of a system with a virtualized Radio Access Network (vRAN) architecture, according to an embodiment of the current disclosure.

In many embodiments, Applicants have realized that 5G networks raise many new technological challenges. In most embodiments, Applicants have recognized that end radio, millimeter wave communication, general front haul, and backhaul transport may raise questions of power usage and bandwidth in each portion of the network. In almost all embodiments, Applicants may have developed techniques and apparatus that enable more efficient 5G networks.

In most embodiments, it may be necessary to aggregate data streams from multiple radio signals. In further embodiments, it may be necessary to transmit data streams aggregated from multiple radios and transmit the aggregated data through a front haul network. In certain embodiments, aggregated data from radios may be combined, transformed into a different type of data, and transmitted using millimeter wave. In further embodiments, millimeter wave transmissions may be aggregated and combined into a data stream. In some embodiments, aggregated millimeter wave transmissions may be transformed into a different data stream and transmitted to a front haul end point. In other embodiments, front haul data may be transmitted to a back-haul. In further embodiments, it may be necessary to transmit or receive data from a plurality of sources such optical, mmWave, MIMO, SERDES and radio.

In certain embodiments, aggregated data may be converted from analog to digital data or from digital to analog data or a combination of digital and analog data based on the output transmission medium. In almost all embodiments, Applicants have realized that there is not a standard device that enables efficient translation of analog to digital data and digital to analog data in a 5G network. In some embodiments, Applicants have realized that typical equipment in a 5G network may include a number of disparate ADCs, DACs, and FPGAs, connected together to try and aggregate data and convert it between digital and analog, and analog and digital formats. In almost all embodiments, Applicants have realized that a combination of ADCs, FPGAs, and DACs are expensive and power hungry.

In most embodiments, Applicants have created a transceiver that can receive multiple data streams, combine the data streams, provide translation between digital and analog formats, encode/decode the data, and transmit and receive the encoded data would solve many problems in a 5G network. In most embodiments, Applicants have created an RU ASIC that can receive multiple data streams, combine the data streams, provide translation between digital and analog formats, encode/decode the data, and transmit and receive the encoded data would solve many problems in a 5G network. In some embodiments, a transceiver may be a new type of coherent transceiver. In many embodiments, a transceiver may have a custom ASIC. In certain embodiments, a transceiver may have multiplexing and demultiplexing capability. In some embodiments, a transceiver may have analog to digital converters (ADCs) and digital to analog to digital converters (DACs). In almost all embodiments, combining multiple functionality into a single transceiver may provide functionality at a lower cost and with greater power efficiency. In almost all embodiments, combining multiple functionality into a single CMOS or ASIC may provide functionality at a lower cost and with greater power efficiency. In some embodiments herein, a custom ASIC, a RU ASIC, an ASIC, a CMOS, a CMOS integrated circuit, and a custom CMOS, may be used interchangeable herein. In certain embodiments, transceiver and a transceiver with a RU ASIC/ASIC/custom ASIC may be used interchangeable herein.

In certain embodiments, a transceiver may receive data from radios, combine the data from the radios, convert digital data to analog data, encode and transmit the analog data to another transceiver. In some embodiments, a transceiver may transmit analog data using millimeter wave. In other embodiments, a transceiver may receive analog data, decode the data, transform analog data to digital data, and transmit respective pieces of the digital data to respective radios. In some embodiments a transceiver may have a custom ASIC to perform one more of the aforementioned functions. In many embodiments, a transceiver may have analog to digital converters and digital to analog converts. In most embodiments, a transceiver may have one or more multiplexors and demultiplexors.

In certain embodiments, a CMOS or ASIC may receive data from radios, combine the data from the radios, convert digital data to analog data, encode and transmit the analog data to another transceiver. In some embodiments, a CMOS or ASIC may transmit analog data using millimeter wave. In other embodiments, a CMOS or ASIC may receive analog data, decode the data, transform analog data to digital data, and transmit respective pieces of the digital data to respective radios. In some embodiments a CMOS or ASIC may have a custom ASIC to perform one more of the aforementioned functions. In many embodiments, a CMOS or ASIC may have analog to digital converters and digital to analog converts. In most embodiments, a CMOS or ASIC may have one or more multiplexors and demultiplexors.

In other embodiments, a transceiver may receive data from a number of millimeter wave transmissions, aggregate the data from the transmissions, encode the aggregated data, and transmit the aggregated data to another transceiver. In some embodiments, a transceiver may convert digitally received data to analog data. In further embodiments, a transceiver may receive a stream of data, decode the data, demultiplex or divide the data stream, and transmit each of the divided data streams using different millimeter wave transmissions.

In other embodiments, a CMOS or ASIC may receive data from a number of millimeter wave transmissions, aggregate the data from the transmissions, encode the aggregated data, and transmit the aggregated data to another transceiver. In some embodiments, a CMOS or ASIC may convert digitally received data to analog data. In further embodiments, a CMOS or ASIC may receive a stream of data, decode the data, demultiplex or divide the data stream, and transmit each of the divided data streams using different millimeter wave transmissions. In certain embodiments herein, transform or transforming of data may refer to the process of receiving data of one type from a transport medium, digital or analog, and changing it into another type of data digital or analog, for a second transport medium. In some embodiments, transforming data may include encoding or decoding data. In many embodiment herein, routing or switching may refer to mapping data from one or more first transport mediums to one or more second transport mediums.

In some embodiments, 5G millimeter wave may be used instead of optical fiber for network fronthaul. In certain embodiments, to achieve very high data rates with 5G millimeter wave, for example around 28 gigahertz, reach may be very small, and there may need to be a radio every few hundred yards. In some embodiments, connecting radios together with fiber, especially in cities, may require a significant investment in fiber infrastructure.

In certain embodiments, running fronthaul on a 5G network may provide significant improvements to current infrastructure, and reduce or eliminate use of optical fiber to connect 5G radios. In one embodiment, a device may need to be able to communicate to both end-device users and a network backhaul.

In most embodiments, using a millimeter wavelength a 5G radio may both talk to a distributed unit while also piping through data from a distributed unit to the 5G radio. In most embodiments, 5G radios may be linked together to build up a mesh network.

In most embodiments, combining the functionality of a millimeter wave transmitter with that of a coherent transceiver may create a single device that enables a 5G radio to communicate over fiber and over radio. In many embodiments, a single multipurpose millimeter wave transceiver and coherent transceiver device may be connected to other multipurpose transceivers to form a network.

In some embodiments, it may be beneficial to aggregate several millimeter wireless signals into a single aggregated signal, which may be transmitted with a coherent receiver. In most embodiments, a 5G radio capable of communicating with other 5G radios may be driven by a coherent receiver. In many embodiments, a single device, such as a coherent transceiver may drive both coherent communication and radio communication.

In most embodiments, a multipurpose transceiver may be used to connect millimeter wavelengths back to the front haul. In some embodiments, a multipurpose transceiver may be used to connect millimeter wavelengths to optical fibers. In many embodiments, a multipurpose transceiver may be used to connect to multiple radios, which are traditionally connected by optical fibers.

In most embodiments, a multipurpose transceiver which combines millimeter wave communication capabilities and coherent communication capabilities may sit between a radio head interface and a provider device or the backhaul of a provider. In many embodiments, using a multipurpose transceiver may enable a more efficient fronthaul network. In most embodiments, a multipurpose transceiver may connect to a digital distribution unit (DU). In most embodiments, the DU may connect to several multipurpose transceivers on one side (fronthaul) and connect to a base station or main network on another side (backhaul).

In some embodiments, additional ports, antennas, and/or radio bands may enable communication between several radio heads. In some embodiments, additional ports, antennas, and/or radio bands may enable communication between several DUs. In many embodiments, radio heads and other fronthaul components may be daisy-chained together. In certain embodiments, several embodiments may be daisy-chained together.

In an embodiment, a transceiver may communicate with and aggregate communications from several radio heads. In some embodiments, a transceiver may communicate with and aggregate communications from several DUs. In many embodiments, a transceiver may communicate with and aggregate communications from several other embodiments. In other embodiments, a transceiver may enable communication between any number of inbound digital and analog interconnects and any number of outbound digital and analog data connects by converting data types and routing the respective data to the appropriate interconnect.

In certain embodiments, radio transmission signals may be aggregated together into a single signal. In some embodiments, an aggregated radio transmission signal may be transmitted by a coherent type receiver. In most embodiments, transmission may resemble a 2-dimensional constellation. In traditional implementations, an aggregated electrical signal may need to be superimposed on an optical carrier for coherent communication. In certain embodiments, an optical carrier may be approximately 193 terahertz. In most embodiments, bandwidths may have certain similarities, such as, for example, the type of signal processing which may be performed on each signal.

In some embodiments, in millimeter wave communications, four converters may provide the two dimensions (I and Q) of a constellation, and two polarizations may be used to transmit horizontally and vertically polarized signals. In certain embodiments, a transceiver may include several components such as serial interfaces, chip routers, processor chips, various ADCs, various DACs, and/or FPGAs.

In most embodiments, a multipurpose transmitter may function in both an electrical and an optical domain. In some embodiments, a constellation radio may communicate through millimeter waves to a DU. In certain embodiments, an amplitude modulated or electrical signal may communicate with various radio heads. In most embodiments, a radio and/or coherent transmission may communicate with various protocols, such as, for example, Ethernet.

In some embodiments, dual or multiple interfaces may provide redundancies in case of failure of one radio communication. In certain embodiments, dual or multiple interfaces may allow communication between multiple points. In many embodiments, 4 or 8 or more radio heads interfaces may be connected with some combination of framing, merging, and separating logic.

In most embodiments, a communication may be converted up or down. In some embodiments, communication may be mixed externally with a separate carrier or shifting signal. In some embodiments, this up or down shifting may occur in the base station. In certain embodiments this up or down shifting may occur in the radio. In some embodiments, up or down shifting in the base station may reduce the complexity of the radio.

In most embodiments, a communication driver for millimeter wavelength communication and/or coherent communication may be separate from other components. In some embodiments, a DSP may contain a communication driver. In certain embodiments, a DSP may replace a communication driver. In some embodiments, a multipurpose transceiver may significantly reduce the system resource cost and/or power cost when compared with the combination of components used to achieve a similar function. In certain embodiments, a reduction in power costs may be of a magnitude of 10×.

In many embodiments, a communication or transmission system may include a transmitter and a receiver. In most embodiments, a transmission, such as a set of bits, may be encoded in a signal at a transmitter. In most embodiments, a transmitter may transmit an encoded signal to a receiver. In certain embodiments, a receiver may receive a signal from a transmitter and decode the signal into information.

Often, a transmitter may modulate a signal, according to a modulation scheme, sent to a receiver. Conventional modulation schemes associate data bits with symbols. Quadrature amplitude modulation (QAM) is one example type of a typical type of modulation scheme and is commonly used in many communication systems including fiber optical and digital radio communications. Generally, the number of different symbols in a modulation format determines the order of a digital communication scheme. Conventionally, higher order modulation formats enable carrying more bits of information or parity bits per symbol. Usually, by selecting a higher order format of QAM, the data rate of a link can be increased. In some embodiments herein, QAM encoding may be referred to as complex modulation.

In certain embodiments, a link may be referred to a distinct modulated signal. In certain embodiments, a single signal may sent over a link. In other embodiments, multiple signals may be sent over a link. In certain embodiments a link may bean means one physical modulated signal. In some embodiments, with optical signals, a link may be what is sent over one physical fiber. In other embodiments, several separate signals may be combined onto one fiber by transmitting at different center frequencies (wavelengths) to comprise several links. In some embodiments, aggregation may be referred to as one link (e.g. from point A to point B). In other embodiments, aggregation may be referred to as links as each frequency may carry different data intended for different destinations. In certain embodiments, there may be two links for mmWave link one in each direction. In some embodiments, for mmWave transmissions—transmit may be dual polarization (different data on each). In many embodiments for mmWave transmission, RX may be two polarizations. In certain embodiments, to deal with crosstalk between the polarizations or rotation of the signal, a DSP after the ADC, may then has to extract the two separate data streams using a complex digital filter.

In certain embodiments, QAM modulation may be used in a coherent communication system. In some embodiments, a coherent transmitter may be used. In many embodiments, the coherent transmitter may include a modulator enabled to associate data bits with symbols and transmit the symbols over an optical channel. In some embodiments, a modulator may encode an optical signal in a QAM format. In some embodiments, a coherent system may include an coherent receiver. In many embodiments a coherent receiver may include a demodulator enabled to associate symbols received over an optical channel with bits.

Conventionally, a QAM scheme may be associated with a constellation diagram having M points arranged in a two-dimensional plane. Usually, the M points represent the M possible symbols to which data bits may be mapped, where M is an integer. For example, an 8QAM scheme may be associated with a constellation diagram having 8 points arranged in a two-dimensional plane representing 8 possible symbols to which data bits may be mapped. As another example, in conventional 16QAM, data bits are mapped to 16 different symbols. Generally, each particular one of the M points may be associated with a label indicating the bit sequence mapped to the symbol represented by the particular one point. For example, a particular one of the 8 points in a constellation diagram for 8 QAM may be associated with a label (e.g., "010") indicating that data bits "010" are mapped to the symbol represented by the particular one point. Typically, in the presence of noise those 3 bits may exhibit different error probabilities, so they are in different reliability classes. Conventional examples of QAM schemes include 8QAM, 16QAM, 32QAM, 64QAM, and 256QAM schemes. Other conventional modulation schemes include BPSK and QPSK. Generally, each QAM scheme may be a different type of coherent modulation.

In some embodiments, baseband may mean that a complex signal is centered on DC, not a carrier frequency. In a particular embodiment, for a 10 GHz bandwidth signal, baseband may be between −5 GHz and +5 GHz, where a complex signal may have negative and positive frequencies.

In some embodiments, forward error correction (FEC) may be a way of reducing errors in transmission of data over unreliable and/or noisy communication channels. In some embodiments, coherent communication systems, for example, may use forward error correction to reduce transmission errors. In some embodiments, forward error correction may involve encoding data for transmission over a communication channel by adding redundancy to the data. Referring to FIG. 1, FIG. 1 is a block diagram of a system 100 with a virtualized Radio Access Network (vRAN) architecture, according to an example embodiment. System 100 includes a number of user equipment (UE) 102.1 and 102.2, a mobile core network 108, and a vRAN 170, which may be a disaggregated vRAN 170 including a CU-CP component 104 (also referred to as CU-CP 104), a CU-UP component 106 (also referred to as CU-UP 106), a first DU component 110 (also referred to as first DU 110), a second DU component 120 (also referred to as second DU 120), and a third DU component 130 (also referred to as third DU 130), a number of first RUs 111, 112, and 113 interfacing with/currently being served by the first DU 110, a number of second RUs 121, 122, and 123 interfacing with/currently being served by the second DU 120, and a number of third RUs 131 and 132 interfacing with/currently being served by the third DU 130.

Generally, vRAN 170, may be configured to provide 3GPP private 4G/LTE, 5G/nG, and/or CBRS mobile network services via first DU 110/first RUs 111, 112, and 113; second DU 120/second RUs 121, 122, and 123; and third DU 130/third RUs 131 and 132 to one or more UE, such as UE 102.1 and 102.2.

An RU, such as any of RUs 111, 112, 113, 121, 122, 123, 131, and 132, may terminate any combination of a WWA (e.g., cellular) and/or WLA (e.g., Wi-Fi®) air interface for any combination of Radio Access Technology (RAT) types (sometimes referred to more generally as 'accesses') for vRAN 170 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNB s or eNodeBs), 5G next Generation Node B s (gNB s or gNodeB s), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UE 102.1 and 102.2, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE.

A DU (also sometimes referred to as a baseband unit) may provide lower level operations of the radio signal processing stack, such as Radio Link Control (RLC), Medium Access Control (MAC), and higher PHY layer operations, such as digital processing, including signal modulation, encoding, and scheduling, among others. A CU-UP may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU-UP can be varied depending on implementation and/or configuration of a given vRAN/network architecture. Further, in addition to operations discussed for embodiments herein, a CU-CP, such as CU-CP 104, generally operates to control DU(s) and the CU-UP for a vRAN architecture, such as vRAN 170, via Radio Resource Control (RRC) functions and the control plane part of the PDCP protocol. In addition to radio signal processing operations, CU-CP/UP 104/106, DUs 110, 120, and 130, and RUs 111, 112, 113, 121, 122, 123, 131, and 132 may perform additional operations as discussed for various embodiments herein.

A UE, such as UE 102.1 and 102.2, may be associated with any user, subscriber, employee, client, customer, electronic device, etc. wishing to initiate a flow in system 100 and may be inclusive of any device that initiates a communication in system 100, such as a computer, an electronic device such as an industrial device, automation device, enterprise device, appliance, Internet of Things (IoT) device, etc., a laptop or electronic notebook, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.), controllers, software, logic, and/or any other elements/entities that may facilitate over-the-air RF connections with one or more access networks. The terms 'UE' and 'client' are used herein interchangeably.

Mobile core network 108 may be configured as any combination of a (private or non-private) 4G/LTE core, typically referred to as the Evolved Packet Core or System (EPC/EPS), 5G core or system (5GC/5GS), next Generation (nG) core or system (e.g., a Sixth Generation (6G) core/system, etc.), and/or the like as may be defined by 3GPP or other similar standards and may include any components, network elements, etc. in order to facilitate operations discussed herein. For example, in one instance for a 5G/nG mobile network core, the CU-CP 104 may interface with a 3GPP Access and Mobility Management Function (AMF)

within the core and the CU-UP 106 may interface with one or more 3GPP User Plane Functions (UPFs) within the mobile core network 108.

As illustrated for FIG. 1, each corresponding DU 110, 120, and 130 may have network connectivity with each corresponding RU 111, 112, 113, 121, 122, 123, 131, and 132 to enable various network/performance measurements to be performed between each DU and each RU, as discussed in further detail herein. Aside from network connectivity, each first RU 111, 112, and 113 is paired or assigned to first DU 110; each second RU 121, 122, and 123 is paired/assigned to second DU 120; and each third RU 131 and 132 is paired/assigned to third DU 130 in which each pairing/assignment is configured in order to facilitate data flow communications between each DU and the RUs served by each DU. Each of first DU 110, second DU 120, and third DU 130 further interface with CU-CP 104 via a corresponding F1-C interface and CU-UP 106 via a corresponding F1-U interface. Each of CU-CP 104 and CU-UP 106 further interface with each other via an E1 interface and with mobile core network 108.

Generally, connectivity between each DU and each RU may be referred to herein as 'fronthaul' connectivity, connectivity between each DU and the mobile core network 108 may be referred to herein as 'backhaul' connectivity. It is to be understood, however, that the fronthaul and backhaul terms are provided for illustrative purposes only and are not meant to limit any of the broad features described herein. Generally, CU-UP to DU connectivity is provided as Internet Protocol (IP) connectivity, such as user plane General Packet Radio Service (GPRS) Tunneling Protocol (GTP-U) over IP, and CU-CP to DU connectivity is provided as IP connectivity, such as Stream Control Transmission Protocol (SCTP). In some instances, fronthaul user plane and control plane connectivity between each DU and each RU is facilitated via Common Public Radio Interface (CPRI) or enhanced CPRI (eCPRI) protocols. In some instances, fronthaul CPRI/eCPRI payloads (e.g., user and/or control plane payloads) between each DU and each RU may be transported over Ethernet or UDP/IP transports.

In one embodiment, as prescribed by Open Radio Access Network (O-RAN) Alliance Working Group 4 (WG4) Specification 'O-RAN.WG4.MP.0-v04.00' (referred to herein generally as the 'O-RAN WG4 Specification'), a 'processing element endpoint' can be configured on each RU 111, 112, 113, 121, 122, 123, 131, and 132 based on the DU to which each RU is assigned that includes transport-based identifiers that define local and remote endpoints that are to be used for specific data flows between each RU and the DU to which each RU is assigned. Stated differently, a 'processing element endpoint' is the O-RAN construct used to configure flows (that can be used for data flow transport, measurement operations, etc.) on the fronthaul interface between each RU and the DU with which each RU is assigned.

In various embodiments, a processing element endpoint configuration, depending on the transport type/network connectivity (e.g., Ethernet, IP, etc.) between each DU/RU, may identify any of: different (alias) Media Access Control (MAC) addresses, virtual local area network (VLAN) identity and MAC addresses; and/or User Datagram Protocol (UDP) ports and Internet Protocol (IP) addresses for the DU to which each RU is assigned. A particular processing element endpoint definition configured for a given RU/DU assignment can be provided a 'name' or other identifier that can be used by other systems, nodes, etc. (e.g., management node 140) to tie certain flows to DUs.

For the embodiment of FIG. 1, consider that a corresponding initial/primary processing element endpoint is initially configured for each of RU 111, 112, and 113 based on an initial assignment/pairing of each RU 111, 112, and 113 to DU 110. Each initial/primary processing element endpoint configuration for each corresponding RU 111, 112, and 113 can be provided a unique name or identifier that uniquely identifies the initial/primary RU-DU pairing for each RU. The DU 110 is also configured with a corresponding processing element endpoint for each of RU 111, 112, and 113 to which it is initially paired for the embodiment of FIG. 1 in which the each processing element endpoint configuration for the DU 110 includes a unique name that uniquely identifies the initial/primary RU-DU pairing for each RU 111, 112, and 113. For example, for the RU 111 and DU 110 initial/primary assignment/pairing, an initial/primary processing element endpoint may be configured for both of RU 111 and DU 110 with a name, such as 'RU 111-DU 110 Primary Processing Element', or any other name that may be used to uniquely identify the RU 111 and DU 110 initial assignment/pairing that facilitates uplink/downlink packet communications between the RU 111 and the DU 110.

Processing element endpoint configuration names configured for RUs and a DU to which the RUs are paired for various assignments/pairings can use the same or different names between the RUs and the corresponding DU to which they are paired for a given configuration (e.g., primary or backup). For example, the DU 110 processing element endpoint configuration for the RU 111-DU 110 pairing could also be named 'RU 111-DU 110 Processing Element' or the like, so long as the DU 110 can identify its corresponding pairing with RU 111.

Further, for the RU 112 and DU 110 initial/primary assignment/pairing, a primary processing element endpoint an initial/primary processing element endpoint may be configured for both of RU 112 and DU 110 with a name, such as 'RU 112-DU 110 Primary Processing Element', or any other name that may be used to uniquely identify the RU 112 and DU 110 initial assignment/pairing that facilitates uplink/downlink packet communications between the RU 112 and the DU 110. Further, for the RU 113 and DU 110 initial/primary assignment/pairing, a primary processing element endpoint an initial/primary processing element endpoint may be configured for both of RU 113 and DU 110 with a name, such as 'RU 113-DU 110 Primary Processing Element', or any other name that may be used to uniquely identify the RU 113 and DU 110 initial assignment/pairing that facilitates uplink/downlink packet communications between the RU 113 and the DU 110.

Further for the embodiment of FIG. 1, consider that a corresponding initial/primary processing element endpoint is configured for each of RU 121, 122, and 123 and for DU 120 based on an initial assignment/pairing of each RU 121,122, and 123 to DU 120 in which each initial/primary processing element endpoint configuration for each corresponding RU 121, 122, and 123 and for DU 120 can be provided a unique name or identifier that uniquely identifies the initial/primary RU-DU pairing for each RU (e.g., using a similar naming scheme as discussed above in which a unique name is provided for each assignment/pairing involving RU 121 and DU 120, RU 122 and DU 120, and RU 123 and DU 120). Further for the embodiment of FIG. 1, consider that a corresponding initial/primary processing element endpoint is configured for each of RU 131 and 132 based on an initial assignment/pairing of each RU 131 and 132 to DU 130. in which each initial/primary processing element endpoint configuration for each corresponding RU 131 and 132 and for DU 130 can be provided a unique name or identifier that uniquely identifies the initial/primary RU-DU pairing for each RU (e.g., using a similar naming scheme as discussed above in which a unique name is provided for each assignment pairing involving RU 131 and DU 130 and also RU 132 and DU 130).

The coverage area of a radio node such as an eNB, gNB, RU, etc. is typically referred to as a 'cell' in which one or more UE may attach to the radio node (RU) that serves the coverage area/cell. Various per-RU coverages areas are illustrated in FIG. 1 in which corresponding fill patterns [a vertical line pattern for DU 110/RUs 111, 112, and 113; a first diagonal line pattern for DU 120/RUs 121, 122, 123; and a second diagonal pattern for DU 130/RU 131 and 132] are provided for each cell coverage area based on the RU/DU pairing/assignment for corresponding DUs serving each cell. Radio parameters for each cell, such as the cell identifier (cell ID) broadcast by each RU, Sounding Reference Signal (SRS) configuration, Time Division Duplex (TDD) configuration, beamforming parameters, etc. and radio or spectral resources for each cell, such as Physical Resource Blocks (PRB s), communication frequencies, etc., are generally managed by the given DU serving each corresponding RU. In various embodiments, cell IDs can include Physical Cell Identifiers (PCIs), E-UTRAN Cell Global Identifiers (ECGIs), and/or New Radio Cell Global Identifiers (NR-CGIs or NCGIs).

In addition to radio parameters and radio resources, each DU and corresponding RU may provide services for one or more slice types. Generally, a 'slice' refers to a collection of one or more network functions that are organized/configured to provide one or more services. In relation to a vRAN architecture, vRAN components, such as DUs/RUs can be configured to manage radio resources, provide scheduling for uplink/downlink communications, manage interference, and/or the like in order to meet various criteria/configurations (e.g., performance guarantees, latency guarantees, etc.) for one or more slice types. Various slice types that may be served by one or more of DUs 110, 120, and 130 and their corresponding RUs may include, but not be limited to, a Ultra-Reliable Low-Latency Communication (URLLC) slice type, an enhanced mobile broadband (eMBB) slice type, and a massive machine-type communication (mMTC) slice type. Various slice considerations may be utilized for the DU failover techniques provided herein.

The initial assignment/pairing of each RU to each DU may be facilitated via management node 140. In one example, the initial assignment/pairing may be set based on any combination of latency, expected load, other service/performance characteristics, operator configuration, and/or the like. In accordance with embodiments herein, management node 140 may also, upon determining a failure of a given DU (e.g., any of DU 110, 120, and/or 130), facilitate reassignment of one or more RUs paired to the failed DU to one or more other (non-failed) DUs. In one embodiment, management node 140 may be implemented as an Operations, Administration, and Maintenance (OAM) node. In one embodiment, management node 140 may be implemented as an O-RAN network management system (NMS), as defined by the O-RAN Alliance. As illustrated in FIG. 1, management node 140 may interface with CU-CP 104, CU-UP 106, and each DU 110, 120, and 130.

Figure 2:
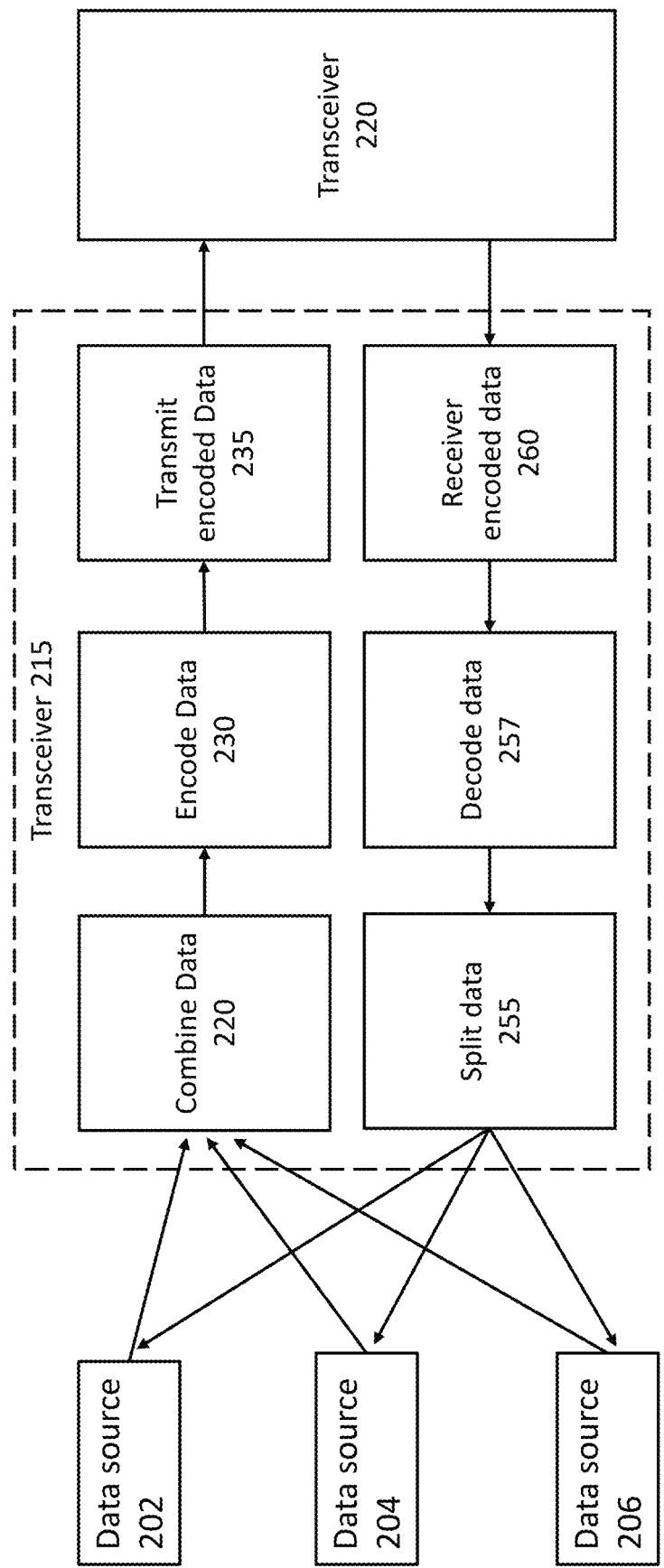
FIG. 2 which illustrates a generic coherent type transceiver for use in a 5G network, according to an embodiment of the current disclosure.

Refer now to the example embodiment of FIG. 2, which illustrates a generic coherent type transceiver for use in a 5G network with a custom ASIC. Data sources 202, 204, and 206 are fed into transceiver 215. Transceiver 215 combines the data sources a single data source. Transceiver 214 encodes the combination of data sources into a data stream. Transceiver 215 transmits the encoded data across a link to a receiving transceiver. Transceiver 215 also receives encoded data 260. Transceiver 215 decodes the data 257. Transceiver 215 splits the data into multiple data sources and transmits the data to the multiple data source 202, 204, and 206. Transceiver 215 has the ability to translate data between digital, such as incoming digital formats, and analog formats, such as data encoded or placed on a coherent optical signal or a millimeter wave. As discussed herein, embodiments of a transceiver, such as Transceiver 215 may have a number of DACs and ADCs located on a custom ASIC.

Figure 3:
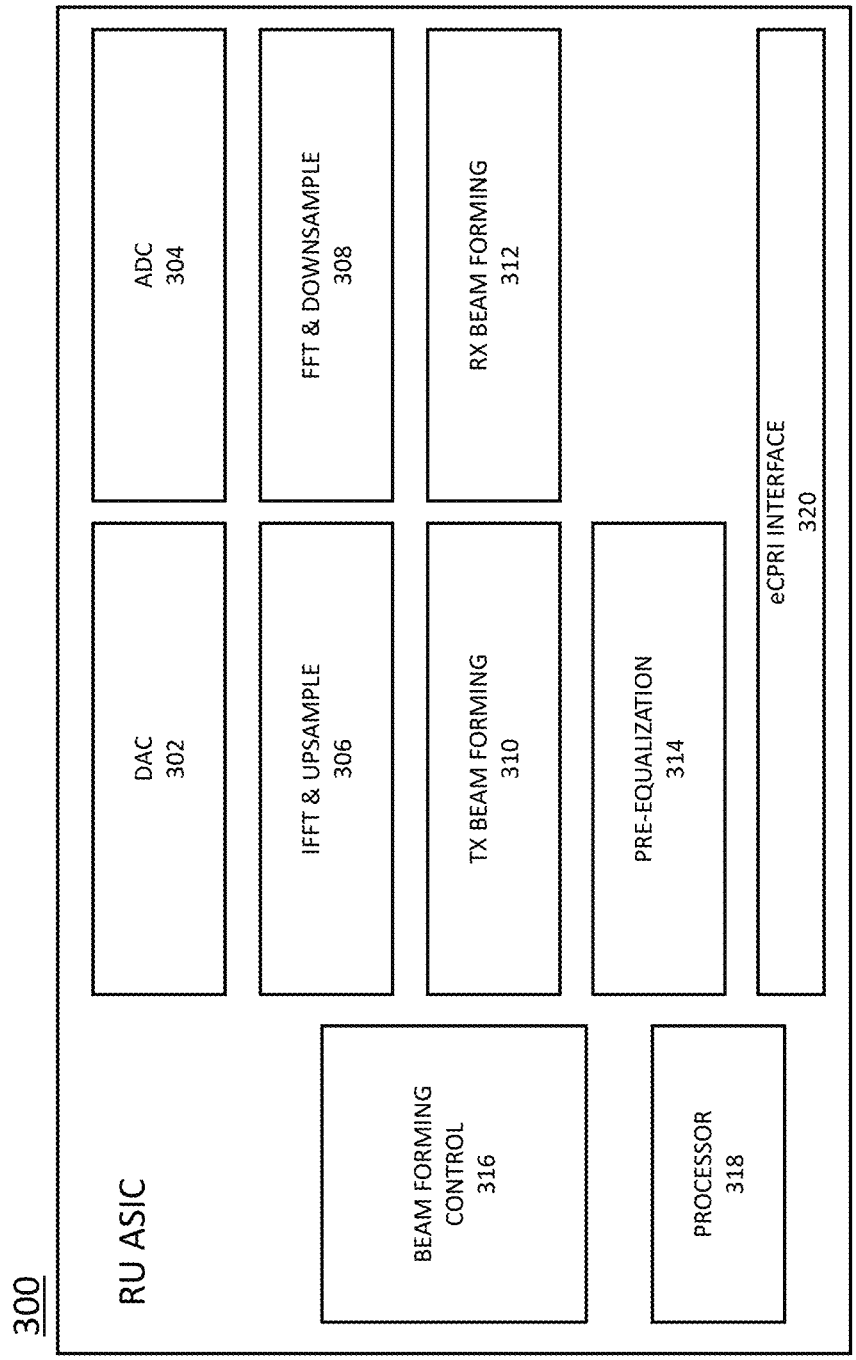
FIG. 3 illustrates a sample RU ASIC, according to an embodiment of the current disclosure.

Refer now to the example embodiment of FIG. 3, which illustrates a sample RU ASIC 300. RU ASIC 300 has DAC 302, DAC 304, IFFT & Upsample 306, FFT & Downsample 308, TX beam forming 310, RX beam forming 312, Pre-equalization 314, Beam Forming Control 316, Processor 318, and eCPRI Interface 320. RU ASIC 300 is a low power low-cost device when compared to traditional DAC/ADC and FPGA type devices.

In operation, RU ASIC 300 receives data from multiple radio elements or multiple antennas elements. RU ASIC 300 combines the data from the multiple elements and encodes the data into a single data stream. The encoded data of the single data stream is transmitted to a base station in a front haul network. In some embodiments, a RU ASIC 300 may cause transmission of data over a millimeter wave. In other embodiments, a RU ASIC 300 may cause transmission of data over an optical fiber. In further embodiments, a RU ASIC 300 may cause transmission of data using free space optics.

Figure 4:
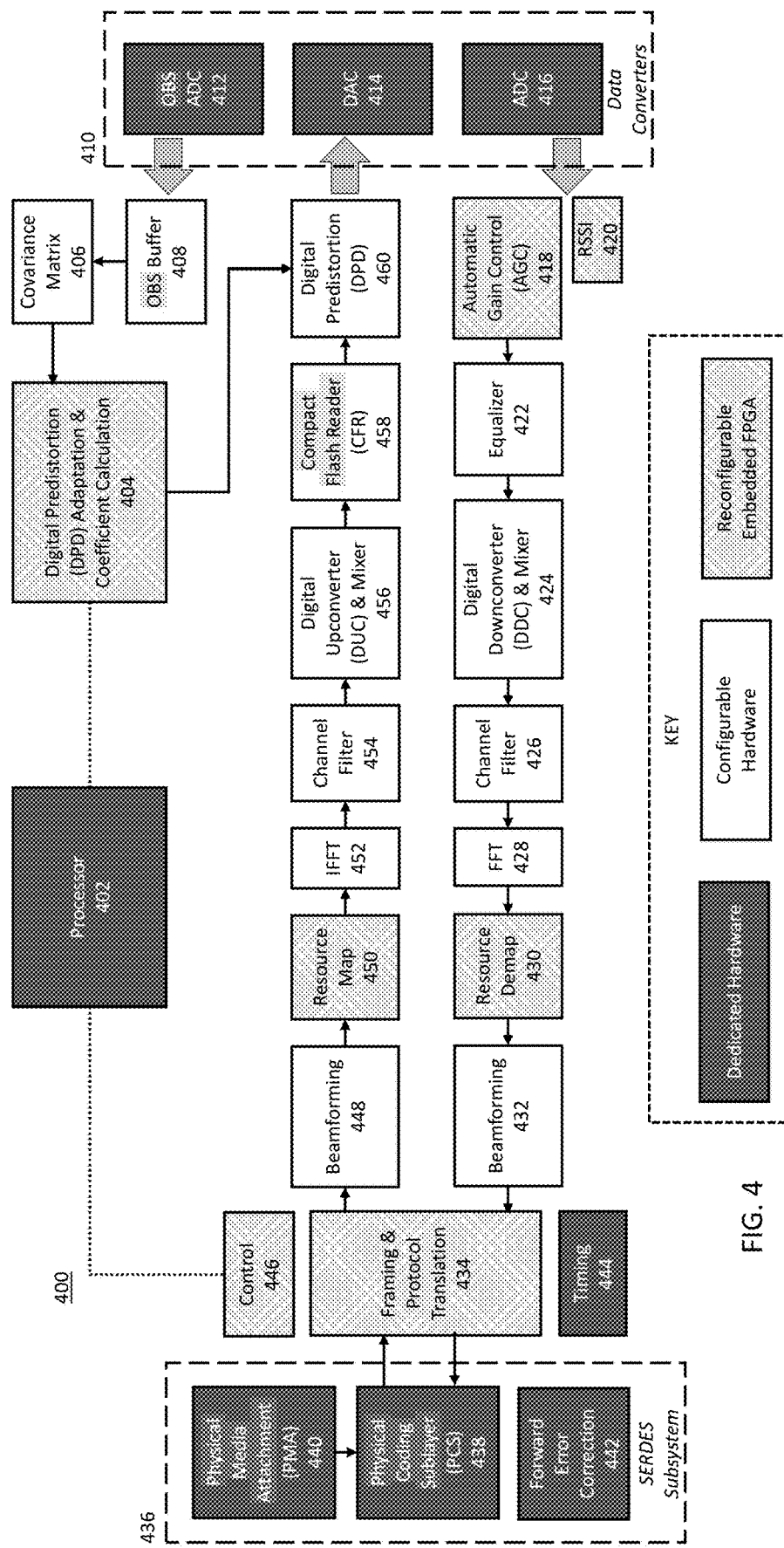
FIG. 4 illustrations a sample embodiment of a Radio ASIC/ASSP, according to an embodiment of the current disclosure.

Refer now to the example embodiment of FIG. 4, which illustrations a sample embodiment of a Radio ASIC/ASSP 400. In some embodiments, portions of ASIC 400 may include dedicated hardware (i.e., non-hardware-configurable hardware). In some embodiments, portions of ASIC 400 may include configurable hardware. Configurable hardware in this application refers to hardware which may be hardware-configured, and does not refer to software or firmware implementations which may simply be run on a processor to enable the execution of some function. In some embodiments, portions of ASIC 400 may include reconfigurable FPGAs.

Returning to the example embodiment of FIG. 4, ASIC 400 includes Processor 402, which connects to DPD Adaptation 404 and Control 446. In some embodiments, Processor 402 may be dedicated hardware. In some embodiments, DPD Adaption 404 may be a reconfigurable FPGA. In some embodiments, DPD 460 may be configurable hardware.

Returning to the example embodiment of FIG. 4, DPD Adaptation 404 is connected to DPD 460. Data Converters 1210 includes a OBS ADC 1212, DAC 1214, and ADC 1216. In most embodiments, OBS ADC 1212, DAC 1214, and ADC 1216 may each be dedicated hardware.

Returning to the example embodiment of FIG. 4, OBS ADC 1212 feeds into OBS Buffer 408. OBS Buffer 408 feeds into Covariance Matrix 406. Covariance Matrix 406 feeds into DPD Adaptation 404. In some embodiments, OBS Buffer 408 may be configurable hardware. In some embodiments, Covariance Matric 406 may be configurable hardware.

Returning to the example embodiment of FIG. 4, ADC 1216 feeds into AGC 1218 and RSSI 420. In some embodiments, AGC may be a reconfigurable FPGA. In some embodiments, RSSI 420 may be a reconfigurable FPGA.

Returning to the example embodiment of FIG. 4, AGC 1218 feeds into Equalizer 422. Equalizer 422 feeds into DDC & Mixer 424. DDC & Mixer 424 feed into Channel Filter 426. Channel Filter 426 feeds into FFT 428. In some embodiments, Equalizer 422 may be configurable hardware. In some embodiments, DDC & Mixer 424 may be configurable hardware. In some embodiments, Channel Filter 426 may be configurable hardware. In some embodiments, FFT 428 may be configurable hardware.

Returning to the example embodiment of FIG. 4, FFT 428 feeds into Resource Demap 430. Resource Demap feeds into Beamforming 432. Beamforming 432 feeds into Framing & Protocol Translation 434. In some embodiments, Beamforming 432 is not present, and Resource Demap 430 feeds directly into Framing & Protocol Translation 434. In some embodiments, Resource Demap 430 may be a configurable FPGA. In some embodiments, Beamforming 432 may be configurable hardware. In some embodiments, Framing and Protocol Translation 434 may be a reconfigurable FPGA. In some embodiments, Framing and Protocol Translation 434 may convert a signal from data bits into a communication protocol or standard, such as for example, Ethernet or 5G. In some embodiments, Framing and Protocol Translation 434 may convert a signal from a communication protocol or standard, such as for example, Ethernet or 5G into data bits.

Returning to the example embodiment of FIG. 4, Framing and Protocol Translation 434 feeds into PCS 438 which is part of SERDES Subsystem 436. SERDES Subsystem 436 also includes PMA 440 and FEC 442. PMA 440 feeds into PCS 438. Timing 444 provides clocks to ASIC 400. In some embodiments, PCS 438 may be dedicated hardware. In some embodiments, PMA 440 may be dedicated hardware. In some embodiments, FEC 442 may be dedicated hardware. In some embodiments, Timing 444 may be dedicated hardware.

Returning to the example embodiment of FIG. 4, PCS 438 feeds into Framing and Protocol Translation 434. Framing & Protocol Translation feeds into Beamforming 448. Beamforming 448 feeds into Resource Map 450. In some embodiments, Beamforming 448 is not present, and Framing & Protocol Translation 434 feeds directly into Resource Map 450. In some embodiments, Beamforming 448 may be configurable hardware. In some embodiments, Resource Map 450 may be a reconfigurable FPGA.

Returning to the example embodiment of FIG. 4, Resource Map 450 feeds into IFFT 452. IFFT 452 feeds into Channel Filter 454. Channel Filter 454 feeds into DUC 456. DUC 456 feeds into CFR 458. CFR 458 feeds into DPD 460. DPD 460 feeds into DAC 1214. In some embodiments, IFFT 452 may be configurable hardware. In some embodiments, DUC 456 may be configurable hardware. In some embodiments, CFR 458 may be configurable hardware. In some embodiments, DPD 460 may be configurable hardware.

Figure 5:
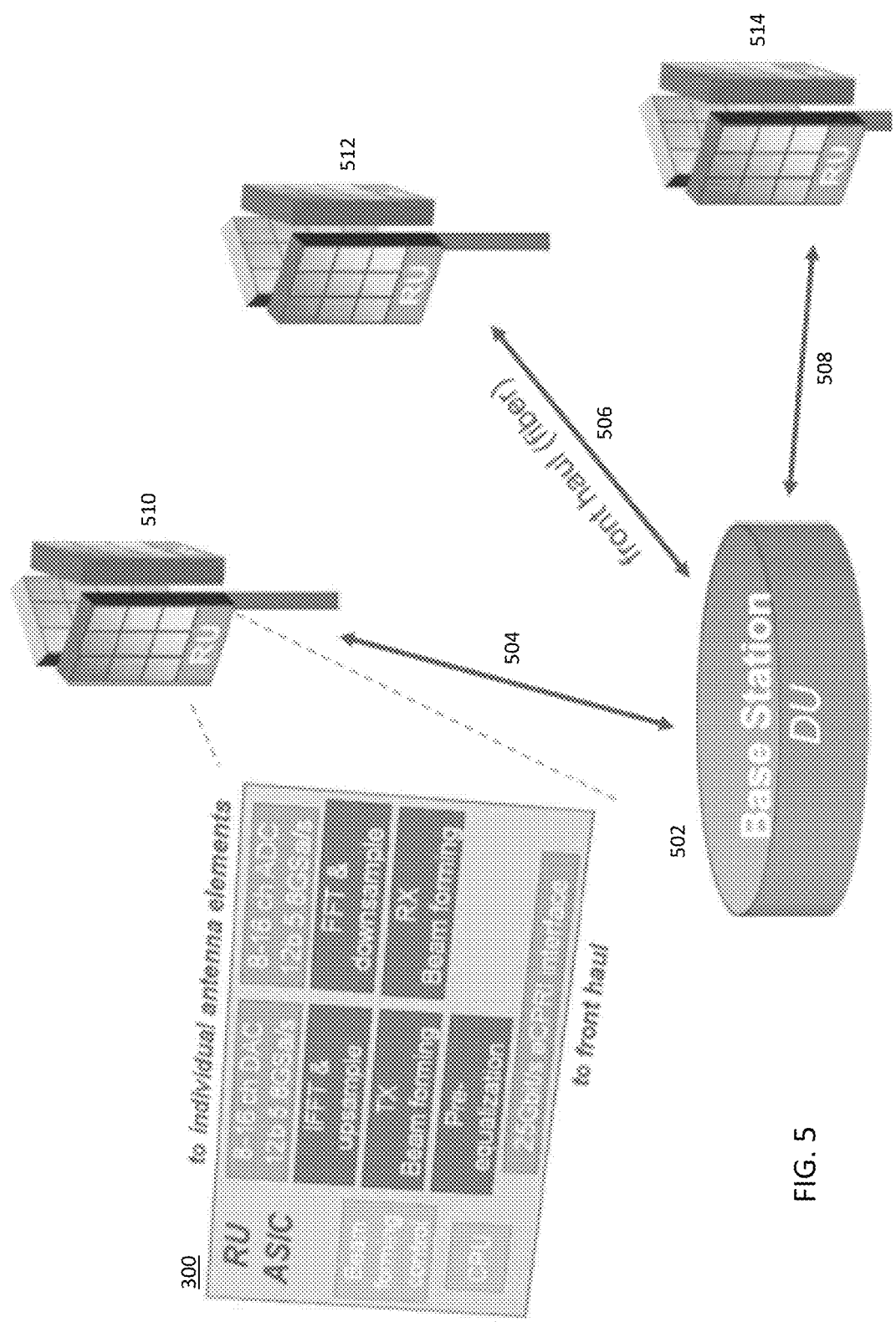
FIG. 5 illustrates placement of an ASIC, according to an embodiment of the current disclosure.

Refer now to the example embodiment of FIG. 5, which illustrates placement of the ASIC of FIG. 3 in a sample network. In the example embodiment of FIG. 5, Base station DU 502 is connected to RUs 1310, 1312, and 1314 through front end fiber 504, 506, and 508. Each RU, such as RU 1310, RU 1312, and RU 1314, has an RU ASIC such as RU ASIC 300 from FIG. 3.

With respect to data being sent from devices, RU ASIC 300 combines radio data from individual antenna elements. RU ASIC 300 converts the digital received data into an analog format, encodes the data onto and optical carrier wave, and transmits the optical carrier wave across front haul fiber, such as front haul fiber 504, 506, or 508.

With respect to data being sent to end nodes, RU ASIC 300 receives data sent from base station DU 502 across front haul fiber 504, 506, or 508. RU ASIC 300 decodes the data on the optical carrier. RU ASIC 300 is enabled to convert the data from an analog to digital data, divide the data in data for each antenna, and send the respective data to each antenna.

Figure 6B:
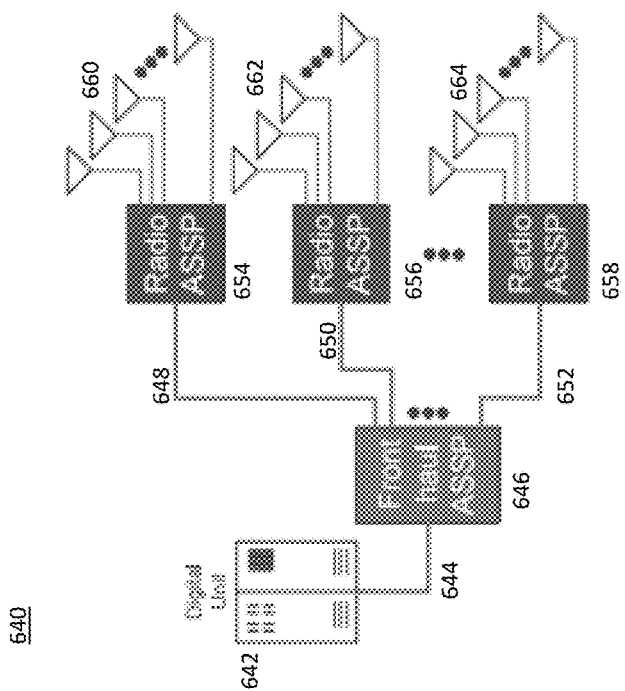
FIG. 6B illustrates an alternative sample Network Setup with RU ASICs with data coming from devices, according to an embodiment of the current disclosure.
Figures 7A, 7B:
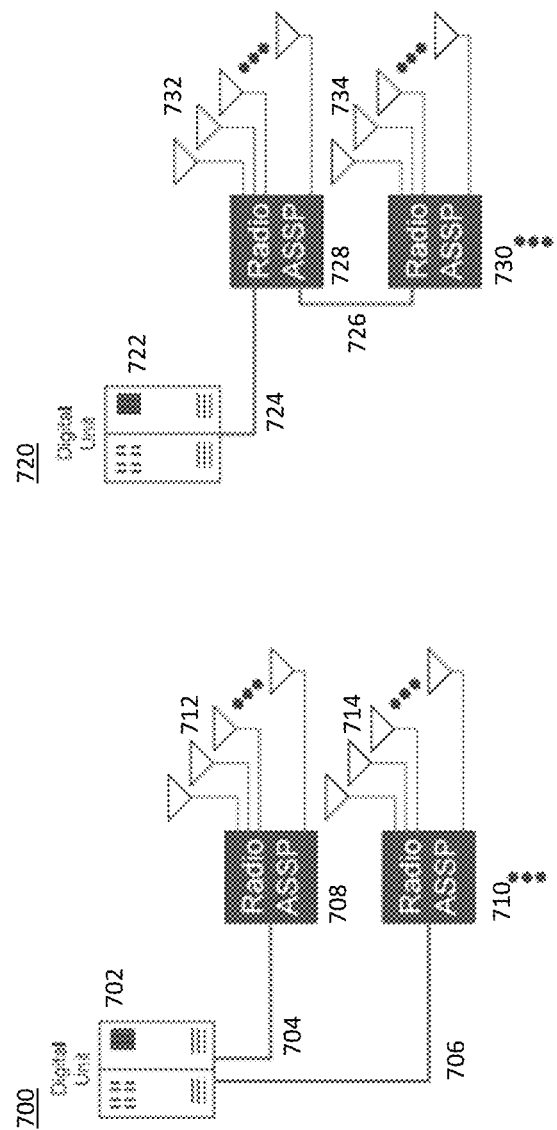
FIG. 7A illustrates a different sample Network Setup with RU ASICs, according to an embodiment of the current disclosure.
FIG. 7B illustrates a sample further Network Setup with RU ASIC, according to an embodiment of the current disclosure.
Figure 8:
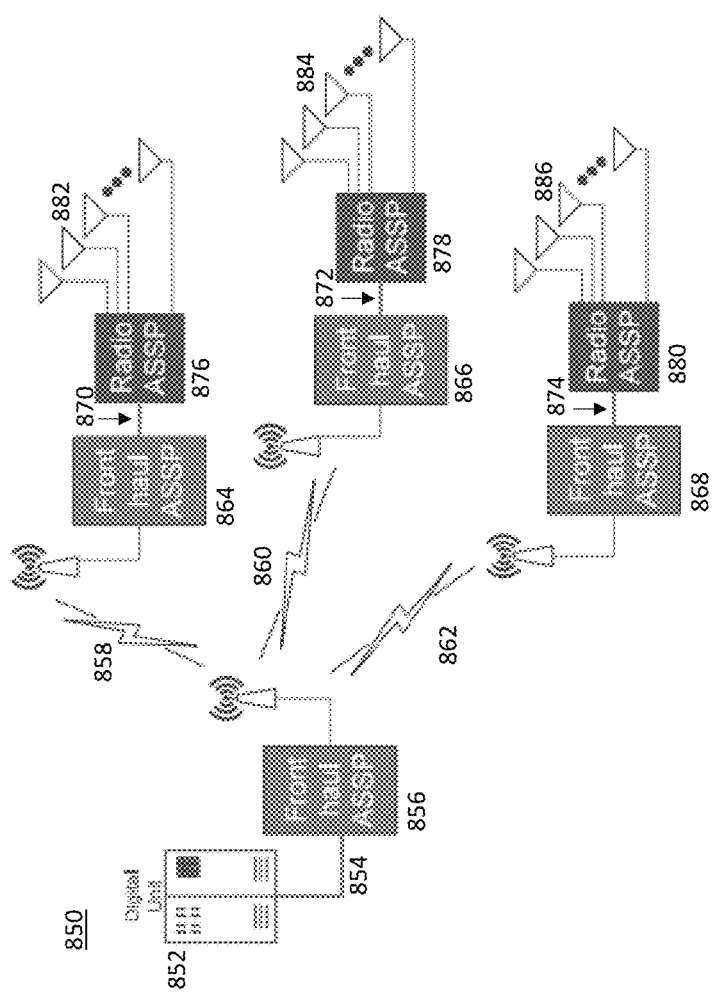
FIG. 8 illustrates a sample alternative Network Setup with RU ASICs, according to an embodiment of the current disclosure.

Refer now to the example embodiments of FIGS. 6-8, which illustrate example configurations of 5G networks where a transceiver with a custom ASIC may be deployed.

Figure 6A:
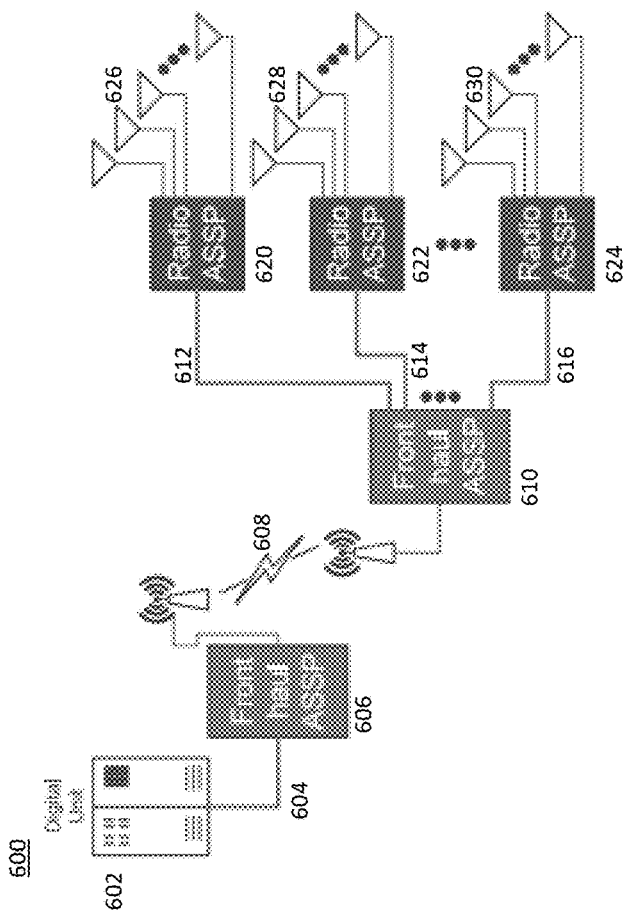
FIG. 6A illustrates a sample Network Setup with RU ASICs with data coming from devices, according to an embodiment of the current disclosure.

FIG. 6A illustrates a sample Network Setup 600 which contains RU ASICs with data coming from devices. Digital Unit 602 is connected to Front Haul ASSP 606 via optical fiber 604. Front Haul ASSP 606 is connected to Front Haul ASSP 610 via radio link 608. Front Haul ASSP 610 is connected to Radio ASSPs 620, 622, and 624 via optical fibers 612, 614, and 616 respectively. Antennas 626, 628, and 630 are connected to Radio ASSPs 620, 622, and 624 respectively. Radio ASSPs 620, 622, and 624 receive radio communications from a device via Antennas 626, 628 and 630.

For incoming communications, RU ASICs, located in each Radio ASSP 620, 622, and 624, receives and aggregates ratio signals received by each respective Radio ASSP into a single data steam. Each RU ASIC of each Radio ASP, 620, 622, and 624, convert the digital data stream into an analog data stream, and encodes the single data stream on to an optical wave and causes the optical wave to be transmitted on an optical fiber, such as optical fibers to 612, 614 and 616 respectively, to Front Haul ASSP 610.

For outgoing communication, each Radio ASSP, such as Radio ASSP 620, 622, and 624 receive an optical communication through an optical link, such as optical link 612, 614, and 616. RU ASICs, such as ASIC of ASSP 620, decode the incoming optical signal, demodulating it, decoding it, and turning it into a digital data stream. RU ASSP, such as RU ASIC of ASSP 620, divides the digital data stream into respective data streams for each ratio radio antenna of radio antennas, such as radio antennas 626, and transmits the respective data stream to each respective antennas.

In some embodiments, a RU ASIC may be integrated with a modulator and laser to cause transmission of the wave across the optical fiber. In some embodiments, RU ASIC may be integrated with radio antenna drivers to transmit data to radio antennas. In many embodiments, RU ASIC may receive digital transmissions from radio signals, combine them into a single digital stream, and convert the single digital stream to an analog format that may be placed on a carrier wave such as an optical wave. In most embodiments, RU ASIC may encode data in a complex format such as QAM. In other embodiments, RU ASIC may encode data in a direct detect format, such as PAM4. In some embodiments, RU ASIC may receive an optical communication, demodulate and decode the transmission converting an analog transmission into a digital transmission, divide and route the digital transmission to respective radio antennas.

Referring back to FIG. 6A, for traffic heading towards the back-haul, Front Haul ASSP 610 has a RU ASIC. Front Haul ASSP 610 receives each optical communication from Radio ASSP 620, 622, and 624. RU ASIC Front Haul ASSP 610 decodes each incoming optical signal, converts the optical signals into digital data streams, combines the digital data streams into a single combined data stream, converts the combined digital data stream into an analog format, encodes the data, and causes the data stream to be transferred over mmWAVE to Front haul ASSP 606.

For traffic heading towards the front haul or radio antennas, Front Haul ASSP 606 receives optical communication from DU 604. Front Haul ASSP decodes converts the analog optical data into a digital data stream, then converts and encodes the digital data stream to an analog data stream to be transmitted over mmWave.

In some embodiments, an RU ASIC of a front haul ASSP may encode the combined data stream in a complex format such as QAM. In other embodiments, RU ASIC may encode the combined data stream in another format. In most embodiments, when receiving an optical communication and transmitting by a mmWave, a RU ASIC will receive an analog data streams, convert the analog data streams into digital data streams, combine the digital data streams, encode and translate the combined digital data streams to an analog data stream to be transmitted by a mmWave transmitter. In certain embodiments herein, conversion between digital and analog signals or analog or digital to analog signals may be part of encoding or decoding a signal.

Referring back to the example embodiment of 6A, for traffic going towards the back haul, RU ASIC Front Haul ASSP 606 receives data from mmWave transmission 608, and transforms the data from a mmWave format to a format that may be transmitted optically across optical link 604 to DU 602. For traffic going towards the radio antennas, RU ASIC Front Haul ASSP 606 receives data from optical ink 604 and transforms the data from an optical format to a format that may be transmitted across mmWave link 608 to Front haul ASSP 610.

In many embodiments, a RU ASIC may perform digital to analog conversions, encode and decode data, and perform different modulation on data streams depending on the input data type and the type of data accepted on the input side of a transmitted link. In almost all embodiments, RU ASIC may function in processing data bi-directionally, in that it is able to process both inbound and outbound data requests. In most embodiments, a RU ASIC provides the ability to receive data of a particular type, translate it to a different type of data, route data, aggregate and divide or switch data. In other embodiments, MIMO may be used as a transport medium instead of mmWave. In further embodiments, other transport mediums may be substituted for either side of an RU ASIC link such as coherent optical, direct detect optical, MIMO, microwave, mmWave, radio, or other types of transport mediums. In further embodiments, an RU ASIC is enabled to bidirectionally combine, divide, route, and transform types of data from one or more transport mediums to a different type of data for one or more other transport mediums.

Refer now to the example embodiment of FIG. 6B, which illustrates a sample Network Setup 640 with RU ASICs. Digital Unit 642 is connected to Front Haul ASSP 646 via optical fiber 644. Front Haul ASSP 646 is connected to Radio ASSPs 654, 656, and 658 via optical fibers 648, 650, and 652 respectively. Antennas 660, 662, and 664 are connected to Radio ASSPs 654, 656, and 658 respectively. Radio ASSPs 654, 656, and 658 receive radio communications from a device via Antennas 660, 662, and 664.

In this example embodiment, RU ASICS in Radio ASSPS 654, 656, and 658, receive incoming data from radio antennas, aggregate the data, and transform the data in a format that may be transmitted across optical links such as 648, 650, and 652. For data being transmitted in an outgoing direction, RU ASIC of Radio ASSP, such as Radio ASSP 654, 656, 658, receives an optical communication, divides the incoming data, transforms and routes the divided data to respective antenna of a radio, such as radio 660, 662, and 664.

Front Haul ASSP 646 has an RU ASIC that is enabled to handle bidirectional communication. For incoming traffic heading towards DU 642, RU ASIC of Front haul ASSP, receives optical data from optical links 649, 640, and 652, and transforms the data to an optical format that is transmitted to DU 642 over optical link 644. For outgoing traffic heading towards Radio ASSPs 654, 656, and 658, RU ASIC of Front haul ASSP, receives an optical communication over optical link 6644, transforms and divides the data to be transmitted across optical links 649, 650, and 652.

In many embodiments, an RU ASIC located in a front haul ASSP between a DU a Radio ASSP connected by optical links, may convert analog optical data to digital data, divide and route the digital data, and encode the divided optical data for transmission on a respective optical link. In other embodiments, an RU ASIC located in a front haul ASSP between a DU a Radio ASSP connected by optical links, may convert analog optical data received from optical links to digital data, combine the digital data, and encode the divided optical data for transmission on an optical link.

Referring back to FIG. 6B, reach Radio ASSP 654, 656, and 658 may have an RU ASIC. Each RU ASIC of Radio ASSP 654, 656, and 658 bidirectionally transforms and routes traffic between radios and front haul ASSP and radio heads or radio antennas. For traffic heading to Front haul ASSP 646, each RU ASIC of Radio ASSPs 654, 656, and 658 aggregates received radio data from radio heads and transforms it into data to data in an optical format to be transmitted across an optical link such as optical link 648, 650, and 654. For traffic heading to radios, each RU ASIC of Radio ASSPs 654, 656, and 658 receives an optical signal encoded with data, divides the data for each respective radio head, transforms, and transmits or causes to be transmitted the data for each respective data head. Depending on the direction of the data, RU ASICs of Radio ASSPs 654, 656, and 658 may encoded the data, decode the data, aggregate the data, disaggregate the data, transform, switch or route the data, convert digital type data to analog type data, and/or convert analog type data into digital data.

Refer now to the example embodiment of FIG. 7A, which illustrates a sample Network Setup 700 which contains multiple instances of an RU ASIC implementation. Digital Unit 702 is connected to Radio ASSPs 708 and 710 via optical fibers 704 and 706 respectively. Antennas 712 and 714 are connected to Radio ASSPs 708 and 710 respectively. Radio ASSPs 708 and 710 receive/transmit radio communications from a device via Antennas 712 and 714. In FIG. 7a, Digital Unit 702 contain a RU ASIC. RU ASIC of DU 702 is enabled to receive optical communications from Radio ASSP 708 and 710 across optical links 704 and 706. RU ASIC of DU 702 is enabled to decode the data from the optical link and enable it to be send across a back haul. RU ASIC of DU 702 also enables data from a back haul to be divided or routed and encoded in a format to be transmitted optically across optical links 704 and 706 to Radio ASSPs 708 and 710 respectively. In certain embodiments, a RU ASIC of a DU may combine received data. In other embodiments, a RU ASIC of a DU may route received data.

Referring back to FIG. 7A, RU ASIC of Radio ASSPs 708 and 710 aggregates a plurality of received radio signals 712 and 714 at each respective Radio ASSP 708 and 710. Each aggregated signal from each Radio ASSP 708 and 710 is encoded onto an optical wave and transmitted by each RU ASIC of Radio ASSP 708 and 710 respectively via optical fibers 704 and 708 respectively, to Digital Unit 702.

Refer now to the example embodiment of FIG. 7B illustrates a sample Network Setup 720 where a RU ASIC creates and interconnect for data. In this example embodiment, Digital Unit 722 is connected to Radio ASSP 728 via optical fiber 724. Radio ASSP 730 is connected to Radio ASSP 728 via optical fiber 726 daisy-chain style. Antennas 732 and 734 are connected to Radio ASSPs 728 and 730 respectively. Radio ASSPs 728 and 730 receive radio communications from a device via Antennas 732 and 734.

Radio ASSP has input from radio antennas 732 and Radio ASSP 730 via optical link 726. RU ASIC of Radio ASSP is enabled to receive digital input from radio antennas 732, optical input from optical link 726, transform the data into a common format, combine the data, transform the data and transmit the data across optical link 724 to digital unit 722. RU ASIC of Radio ASSP is also enabled to receive optical input from Digital unit 722 across optical link 724, convert the data to a common format, divide the data to be sent across optical link 726 to Radio ASSP 730 and radio heads 732, and covert that respective data to the different formats to be transmitted across radios 732 and optical links 726.

In almost all embodiments, a RU ASIC may be able to receive any number of different types on of data from different transport mediums, convert the data to a common format, and transmit the data across one or more transport mediums, where for a plurality of transport mediums, the RU ASIC supports routing data for each respective transport medium and transforming the data to transmitted for that respective transport medium into a format suitable for that respective transport medium. In most embodiments, a RU ASIC may be able to handle any number of inbound and outbound types of digital or analog transport medium.

Refer now to the example embodiment of FIG. 8, which illustrates a sample Network Setup 850 with multiple RU ASICs. Digital Unit 852 is connected to Front Haul ASSP 856 via optical fiber 854. Front Haul ASSP 856 is connected to Front Haul ASSPs 864, 866, and 868 via mmWave links 858, 860, and 862 respectively. Front Haul ASSPs 864, 866, and 868 are connected to Radio ASSPs 876, 878, and 880 via optical fibers 870, 872, and 874 respectively. Antennas 882, 884, and 886 are connected to Radio ASSPs 876, 878, and 880 respectively. Radio ASSPs 876, 878, and 880 transmit radio communications to a device via Antennas 882, 884, and 886. Digital Unit 852 transmits an optical communication via optical fiber 854 to Front Haul ASSP 856.

In FIG. 8, each interconnect such as DU 852, Front haul ASSP 856, Front haul ASSP 864, Radio ASSP 876, Front haul ASSP 866, Radio ASSP 878, Front haul 868, and Radio ASSP 880 have a respective RU AISC. In FIG. 8, RU ASIC of each respective interconnect is enabled to handle bidirection data communication through the respective interconnect. RU ASIC of front haul ASSP 856 is enabled to convert incoming optical data from optical link 854 to outgoing mmWave data communication to front haul ASSP 864 as well as convert incoming mmWave communication from front haul ASSP 864 to outgoing optical data across optical link 854 to DU 852. RU ASIC of front haul ASSP 856 is also enabled to convert incoming optical data from optical link 854 to outgoing MIMO data communication to front haul ASSP 868 as well as convert incoming MIMO communication from front haul ASSP 868 to outgoing optical data across optical link 854 to DU 852. RU ASIC of Front Haul ASSP 864 is enabled to convert mmWave communication across link 858 from front haul ASSP to optical data transmitted across optical link 870 to Radio ASSP 876 and convert optical data from Radio ASSP 876 to mmWave communication across link 858 Front haul ASSP. RU ASIC of Front Haul ASSP 868 is enabled to convert MIMO communication across link 862 from front haul ASSP to optical data transmitted across optical link 874 to Radio ASSP 880 and convert optical data from Radio ASSP 880 to MIMO communication across link 862 Front haul ASSP. In FIG. 8, each interconnect has a RU ASIC enabled to transform data between its incoming and outgoing transport mediums and route data between transport mediums.

Figure 9:
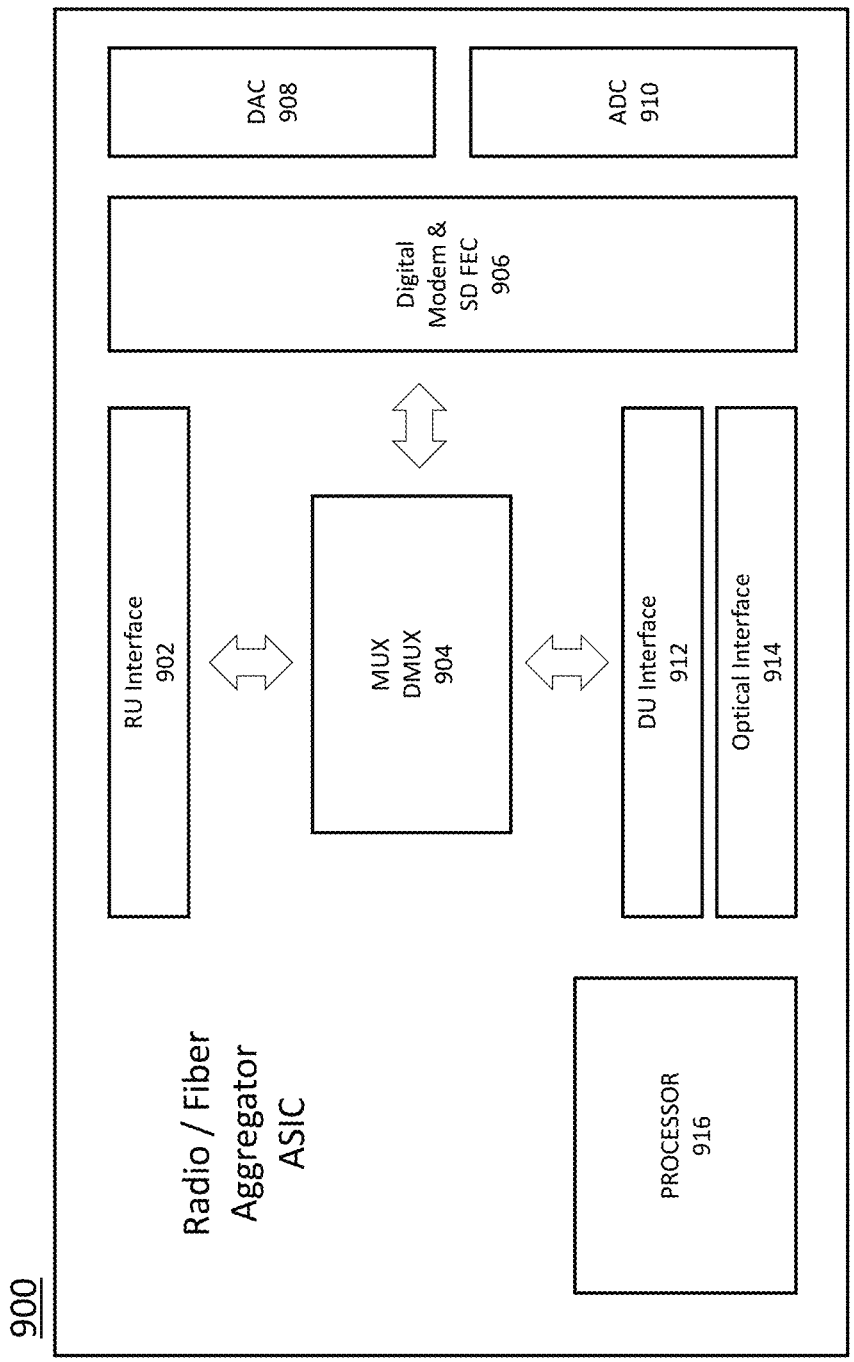
FIG. 9 illustrates a sample RU ASIC, according to an embodiment of the current disclosure.

Refer now to the example embodiment of FIG. 9, which illustrates a sample RU ASIC 900. RU ASIC 900 has RU Interface 902, MUX/DMUX 904, Digital Modem & SD FEC 906, DAC 908, DAC 910, DU Interface 912, Optical Interface 914, and Processor 916. RU ASIC 900 is a low power low-cost device when compared to traditional DAC/ADC and FPGA type devices.

In operation, RU ASIC 900 receives data from multiple radio elements or multiple antennas elements. RU ASIC 900 combines the data from the multiple elements and encodes the data into a single data stream. The encoded data of the single data stream is transmitted to a base station in a front haul network. In some embodiments, a RU ASIC 900 may cause transmission of data over a millimeter wave. In other embodiments, a RU ASIC 900 may cause transmission of data over an optical fiber. In further embodiments, a RU ASIC 900 may cause transmission of data using free space optics.

Figure 10:
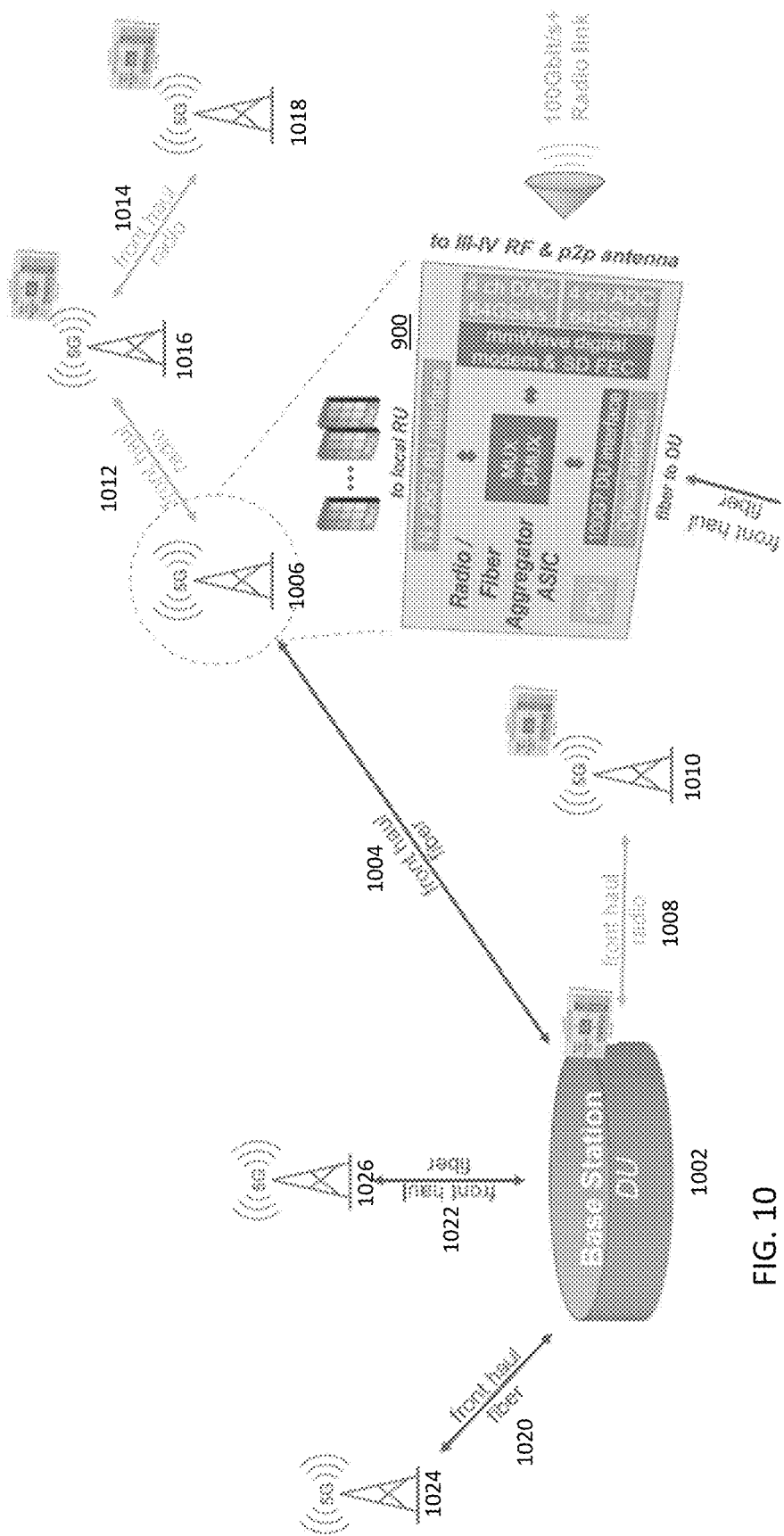
FIG. 10 illustrates placement of an ASIC in a sample network, according to an embodiment of the current disclosure.

Refer now to the example embodiment of FIG. 10, which illustrates placement of the ASIC of FIG. 9 in a sample network. In the example embodiment of FIG. 10, Base Station DU 1002 is connected to a first RU 1006 through front haul fiber 1004. Base Station DU 1002 is also connected to a second RU 1010 through front haul radio 1008. RU 1006 is connected to additional RUs 1016 and 1018 in a daisy-chain fashion, with RU 1016 connected to RU 1006 via front haul radio 1012, and RU 1018 connected to RU 1016 via front haul radio 1014. Each RU, such as RU 1006, RU 1010, RU 1016, and RU 1018 has an RU ASIC such as RU ASIC 900 from FIG. 9. Base Station DU also has an RU ASIC such as RU ASIC 900 from FIG. 9.

With respect to data being sent from to end nodes, RU ASIC 900 receives optical communications from front haul fibers 1004, 1020, or 1022 and decodes the data from an optical carrier wave, transforms the data, and transmits the data via front haul radio 1008, or 1012. RU ASIC 900 receives radio communications from front haul radio 1012, transforms the data, and transmits the data via front haul radio 1014 to RU 1018.

With respect to data being sent from a device, RU ASIC 900 receives radio communications at RU 1006 from front haul radio 1012, transforms the data, encodes the data onto an optical carrier wave and transmits the optical carrier wave to Base Station DU 1002 via front haul fiber 1004. RU ASIC 900 receives radio communications from front haul radio 1008 at Base Station DU 1002 from RU 1010. RU ASIC 900 receives radio communications from front haul radio 1014 at RU 1016, transforms the data, and transmits the data via front haul radio 1012 to RU 1006. RU ASIC 900 receives optical communications at Base Station DU from network towers 1024 and 1026 and from RU 1006 via front haul fiber 1020, 1022, and 1004 respectively.

Figure 11:
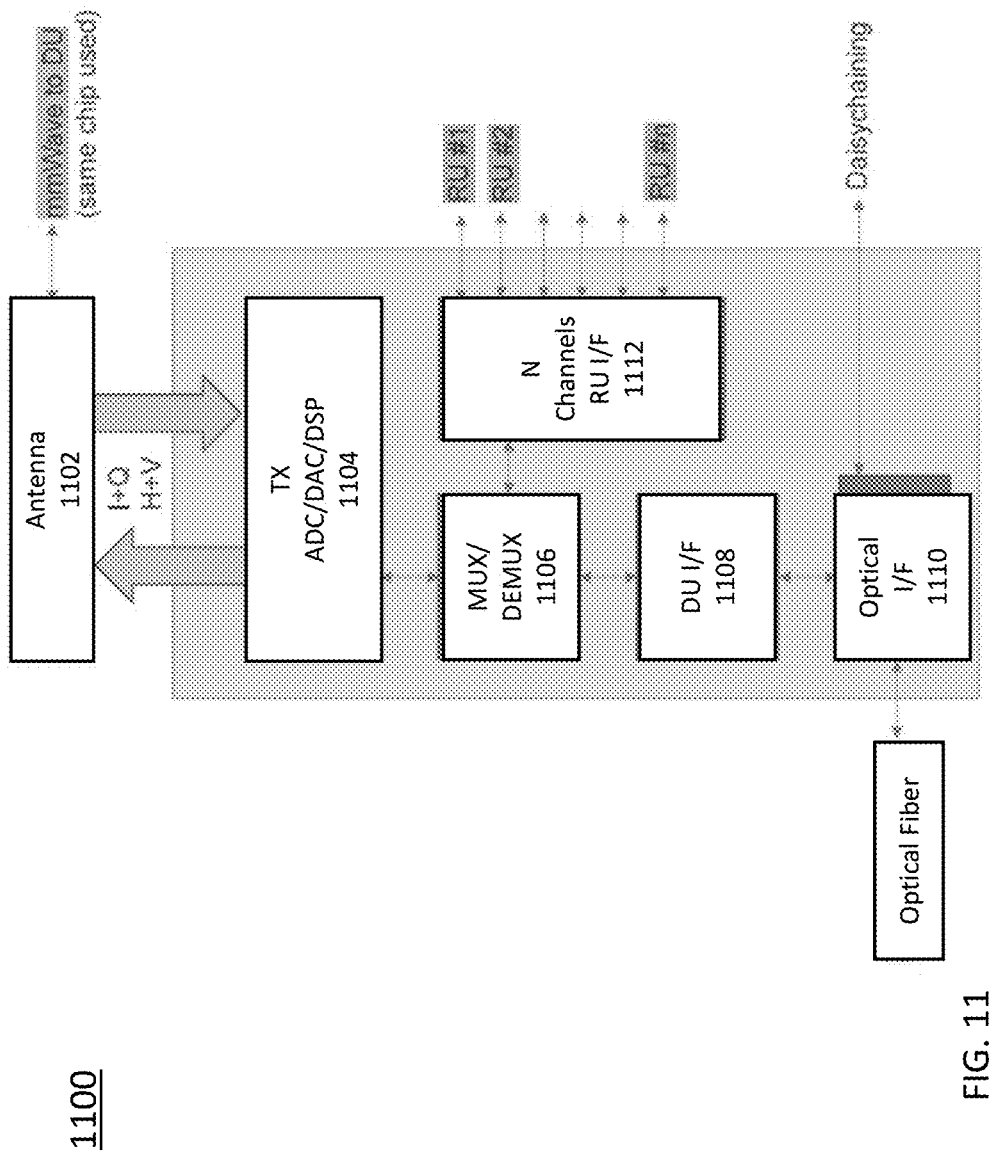
FIG. 11 illustrates a simplistic interaction of an ASIC in a network, according to an embodiment of the current disclosure.

Refer now to the example embodiment of FIG. 11, which illustrates a simplistic interaction of an ASIC 1100 in a network. ASIC 1100 enables aggregation of multiple RUs into one fiber and/or mmWave network with a unified link. In some embodiments, ASIC 1100 may transmit/receive via optical communication, such as through an optical fiber. In some embodiments, ASIC 1100 may transmit/receive via radio communication, such as a mmWave link. In some embodiments, ASIC 1100 may transmit/receive via optical communication and radio communication. In some embodiments, ASIC 1100 may transmit and receive via optical communication simultaneously. In some embodiments, ASIC 1100 may transmit and receive via radio communication simultaneously. In some embodiments, ASIC 110 may transmit/receive via optical communication and simultaneously transmit/receive via radio communication.

Returning to the example embodiment of FIG. 11, ASIC 1100 contains: Antenna 1102, TX ADC/DAC/DSP 1104, MUX/DEMUX 1106, DU I/F 1108, Optical I/F 1110, and N Channels RU I/F 1112. Antenna 1102 communicates with TX ADC/DAC/DSP 1104. Antenna 1102 connects to DU and transmits/receives via mmWave. MUX/DEMUX 1106 is connected to N Channels RU I/F 1112 and DU I/F 1108. DU I/F 1108 is connected to Optical I/F 1110. In this example embodiment, for incoming mmWave transmissions, they are being received, transformed, combined into a single data stream, then sent over an optical fiber. In this example embodiment, optical transmissions are received via an optical fiber, they are split apart to separate data streams, and each data stream is sent via a separate mmWave transmission. In some embodiments, Optical I/F 1110 may be connected externally to other network architecture via an optical fiber. In some embodiments, Optical I/F 1110 may be connected externally to other network architecture such as a DU via daisy-chaining. In some embodiments, N Channels RU OF may be connected to N number of external RUs.

In some embodiments, a CMOS integrated circuit may establish connectivity in a cellular radio network between one or more Distributed Units and one or more Radio Units. In certain embodiments, a CMOS integrated circuit may use mmWave radio links as a communication link. In certain embodiments, a CMOS integrated circuit may use optical links as a communication link. In certain embodiments, a CMOS integrated circuit may use electrical SERDES links as a communication link. In many embodiments, a CMOS integrated circuit may include connectivity that includes the ability to transmit data using digital-to-analogue converters (DACs) and receive data using the analogue-to-digital converters (ADCs), and steering data between various data links using the on-chip switching and routing controlled by e on-chip processor.

In certain embodiments, a CMOS may steer and process data in dedicated hardware. In certain embodiments, a CMOS may steer and process data in configurable hardware. In certain embodiments, a CMOS may steer and process data in a reconfigurable embedded FPGA. In certain embodiments, a CMOS may steer and process data in software.

In some embodiments, a CMOS integrated circuit may have optical links that use coherent signal processing to communicate using complex modulation schemes such as QAM16. In certain embodiments, such as with complex modulation, a CMOS may require 2 DACs and 2 ADCs per link. In many embodiment, a CMOS integrated circuit may transmit an optical signal in dual polarization, requiring 4 DACs and 4 ADCs per link.

In certain embodiments, a CMOS integrated circuit may use optical links that use intensity-modulated signals such as PAM4, which may requiring 1 DAC and 1 ADC per link, or circuits providing the same functionality such as multilevel drivers and slicers. In some embodiments, a CMOS integrated circuit may have drivers for electrical-to optical conversion (such as lasers or modulators) that are on-chip. In many embodiments, a CMOS integrated circuit may have electrical-to optical converters on-chip. In some embodiments, a CMOS integrated circuit receivers for optical signal detection (e.g. Transimpedance Amplifiers or TIAs) on-chip. In some embodiments, a CMOS integrated circuit may have optical-to-electrical converters on-chip.

In many embodiments, a CMOS integrated circuit may have mmWave links that use complex modulation schemes such as QAM16 and are generated at baseband with external analogue conversion between baseband and mmWave frequencies, which may requiring 2 DACs and 2 ADCs per link. In certain embodiments, a CMOS integrated circuit may use mmWave links that use complex modulation schemes such as QAM16 and are digitally generated at an intermediate frequency (IF) with external analogue conversion between IF and mmWave frequencies, which requiring 1 DAC and 1 ADC per link for IF signals, or 2 if image-cancelling mixers are used in the external RF circuits. In some embodiments, a CMOS integrated circuit may have mmWave links that use complex modulation schemes such as QAM16, which may be digitally generated directly at mmWave frequencies, requiring 1 DAC and 1 ADC per link. In certain embodiments, a CMOS integrated circuit may have a mmWave signal that is dual polarization, requiring twice as many ADCs or DACs per link. In some embodiments, a CMOS integrated circuit may have electrical SERDES links that use multilevel signals such as PAM4, requiring 1 DAC and 1 ADC per link, or circuits providing the same functionality such as multilevel drivers and slicers.

In some embodiments, a CMOS integrated circuit where its same circuits may be used for the optical and mmWave links and may be configured to provide either function. In certain embodiments, a CMOS integrated circuit where its circuits may be used for an optical and SERDES links and can be configured to provide either function. In many embodiments, a CMOS integrated circuit where more than one optical link is provided, for example to increase data rates, allow interconnection between different nodes in the network, or to provide fault-tolerance/redundancy in the case of link failure. In some embodiments, a CMOS integrated circuit where more than one mmWave link is provided, for example to increase data rates, provide MIMO functionality, support different radio frequency bands, allow interconnection between different nodes in the network, or to provide fault-tolerance/redundancy in the case of link failure. In many embodiments, a CMOS integrated circuit where more than one electrical SERDES link is provided, for example to increase data rates, or to allow interconnection between different circuits in the Radio Unit including other instances of the circuit of claim 8.

In certain embodiments, a CMOS integrated circuit may have electrical SERDES used to communicate data to one or more radio modems in the Radio Unit which provide the radio signals to a network such as 5G. In some embodiments, a CMOS integrated circuit may have optical links used to communicate data to one or more radio modems in the Radio Unit which provide the radio signals to a network such as 5G.

In many embodiments, a CMOS integrated circuit may have error correction for one or more of the links. In certain embodiments, a CMOS integrated circuit may use soft decision error correction is used for one or more of the links. In some embodiments, a CMOS integrated circuit may have multiple links to provide fault-tolerance or redundancy or allow the network to be reconfigured if unacceptable data loss occurs. In certain embodiments, a CMOS integrated may support different mmWave bands to allow operation to continue with reduced data rates in the event of link degradation, for example fallback from a high-data-rate high-loss band (e.g. 100 GHz) to a lower-data-rate low-loss band (e.g. 10 GHz) which is less sensitive to heavy rain. In some embodiments, a CMOS integrated circuit may enable reconfiguration while the device is in operation to compensate for any faults in the network or reduced-quality mmWave links due to environmental factors such as heavy rain.

Figure 12:
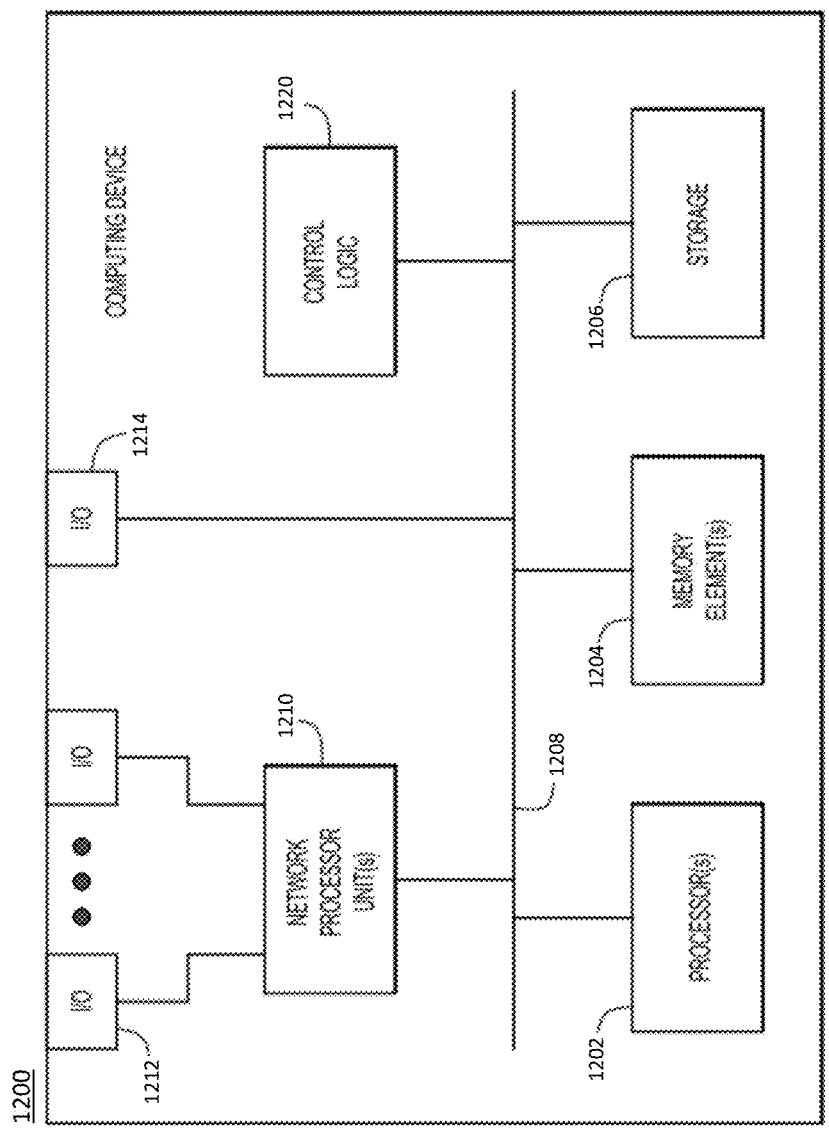
FIG. 12 illustrates a hardware block diagram of a computing device that may perform functions associated with operations, according to an embodiment of the current disclosure.

Refer now to the example embodiment of FIG. 12, FIG. 12 illustrates a hardware block diagram of a computing device 400 that may perform functions associated with operations discussed herein in connection with the techniques discussed herein. In various embodiments, a computing device, such as computing device 1200 or any combination of computing devices 1200, may be configured as any entity/entities as discussed for the techniques discussed herein in order to perform operations of the various techniques discussed herein, such as, for example, management node 140.

In at least one embodiment, computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device. Processor(s) 1202 (e.g., hardware processor(s)) can execute any type of instructions associated with data to achieve the operations detailed herein. In one example, processor(s) 1202 can transform an element or an article (e.g., data, information) from one state or thing to another state or thing. Any potential processors, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fiber Channel (e.g., optical) driver(s) and/or controller(s), wireless receivers/transmitters/transceivers, baseband processor(s)/modem(s) and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fiber Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information (wired or wireless) with other entities that may be connected to computer device 1200. For example, I/O interface(s) 1214 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 13:
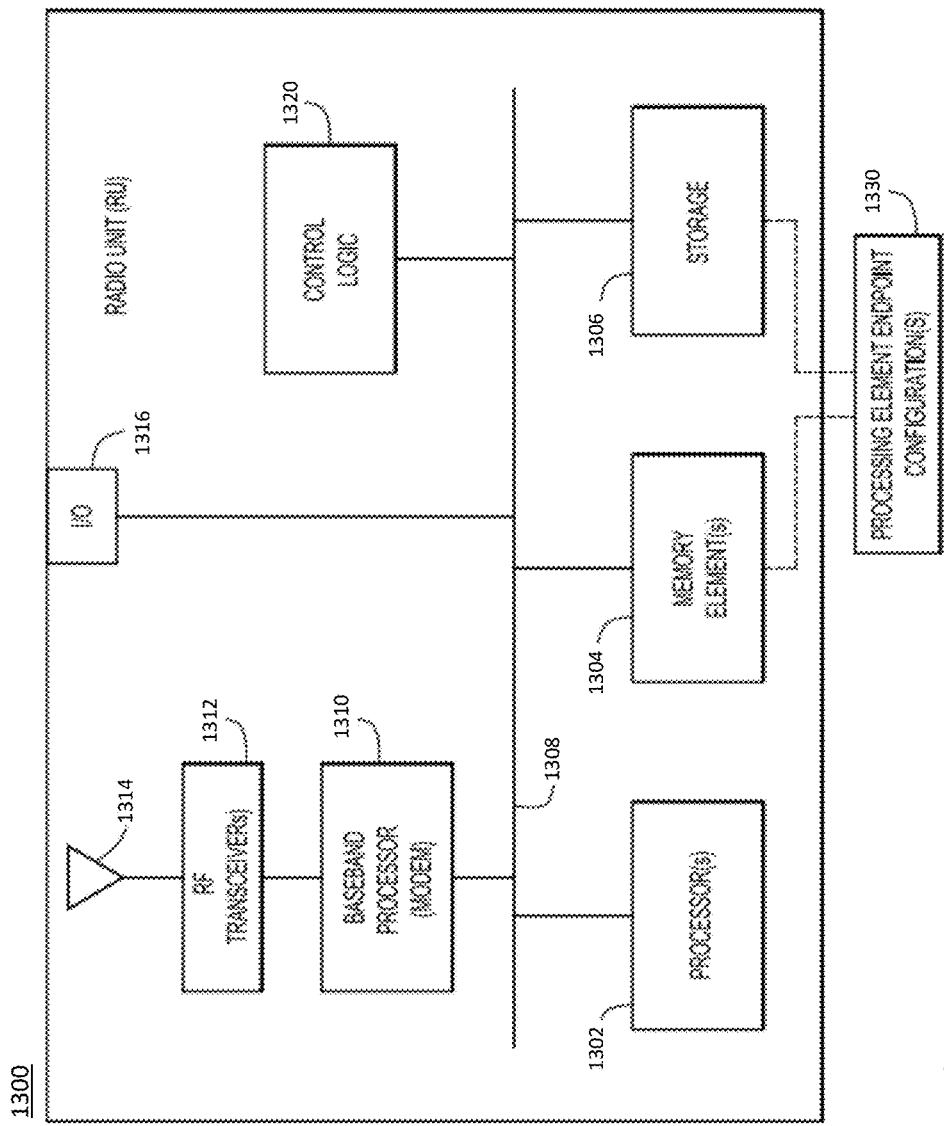
FIG. 13 illustrates a hardware block diagram of a radio unit (RU) that may perform functions, according to an embodiment of the current disclosure.

Referring to FIG. 13, FIG. 13 illustrates a hardware block diagram of a radio unit (RU) 1300 that may perform functions associated with operations discussed herein in connection with the techniques discussed herein. In various embodiments, an RU, such as RU 1300 or any combination of RUs 1300, may be configured as any of RUs 111, 112, 113, 121, 122, 123, 131, and 131 as discussed for the techniques discussed herein in order to perform operations of the various techniques discussed herein.

In at least one embodiment, RU 1300 may include one or more processor(s) 1302, one or more memory element(s) 1304, storage 1306, a bus 1308, a baseband processor or modem 1310, one or more radio RF transceiver(s) 1312, one or more antennas or antenna arrays 1314, one or more I/O interface(s) 1316, and control logic 1320. Also illustrated in FIG. 13, one or more processing element endpoint configuration(s) 1330 may be stored in any combination of memory element(s) 1304 and/or storage 1306 (e.g., backup-pair processing element endpoint configuration(s), a primary-pair processing element endpoint configuration, etc.). In various embodiments, instructions associated with logic for RU 1300 can overlap in any manner and are not limited to the specific allocation of instructions and/or operations described herein.

The one or more processor(s) 1302, one or more memory element(s) 1304, storage 1306, bus 1308, and I/O 1316 may be configured/implemented in any manner described herein, such as described above at least with reference to FIG. 12.

The RF transceiver(s) 1312 perform RF transmission and RF reception of wireless signals via antenna(s)/antenna array(s) 1314, and the baseband processor (modem) 1310 performs baseband modulation and demodulation, etc. associated with such signals to enable wireless communications for RU 1300.

In various embodiments, control logic 1320, to perform operations, which can include, but not be limited to, providing overall control operations of RU 1300; interacting with other entities, systems, logic, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Although not illustrated, it is to be understood that processing element endpoint configurations for one or more DU(s), such as DUs 110, 120, and 130, may also be configured via any combination of memory element(s) and/or storage configured for such DU(s).

The programs described herein (e.g., control logic 1220/1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Refer now to the example embodiment of FIG. 14A which illustrates Terahertz frequency band properties. Terahertz 1402 highlights the frequency band with frequencies ranging from 100 GHz (0.1 THz) to 10 THz on a logarithmic scale. This frequency band encompasses portions of the Millimeter 1404 and Infrared 1408, as well the entirety of Submillimeter 1406. Line 1412 illustrates the attenuation effects of fog on different frequencies. Line 1414 illustrates the attenuation effects of excessive rain on different frequencies. Line 1416 illustrates the attenuation effects of heavy rain on different frequencies. Line 1418 illustrates the attenuation effects of drizzle on different frequencies. Line 1420 illustrates the attenuation effects of atmospheric absorption on different frequencies. In some embodiments, fog may be measured as about 0.1 grams per cubic meter with a visibility of 50 meters. In some embodiments, excessive rain may be measured as about 150 millimeters/hour of rainfall. In some embodiments, heavy rain may be measured as about 25 millimeters/hour of rainfall. In some embodiments, drizzle may be measured as about 0.25 millimeters/hour of rainfall. In some embodiments, atmospheric absorption may be measured as about 7.3 grams per cubic meter at 20 degrees centigrade, or about 1 ATM.

Returning to the example embodiment of FIG. 14A, Terahertz 1402 exhibits high radio coverage limitations due to atmospheric absorption. However, Terahertz 1402 exhibits benefits for spectroscopy and/or detection. Atmospheric Absorption Line 1420 shows that Terahertz 1402 has a high $H_2O$ absorption. Terahertz 1402 also exhibits benefits over Millimeter 1404, Submillimeter 1406, Infrared 1408, and Visible 14010 such as an enhanced and/or distinguishable molecular fingerprint (not pictured), the ability to pass through human skin (not pictured), and the ability to enhance radio coverage via reflected hypersurfaces (not pictured), as well as other benefits. In some embodiments, the benefit of passing through human skin may include cancer detection (not pictured).

Refer now to the example embodiment of FIG. 14B which illustrates Terahertz frequency band properties. FIG. 14B shows an atmospheric absorption frequency attenuation curve 1450 starting at 100 GHz (0.1 THz) and ending at 3,000 GHz (3 THz) on a logarithmic scale. The frequency range shown illustrates a portion of the THz band which exhibits limitations and benefits. In some embodiments, limitations may include radio coverage. In some embodiments, benefits may include spectroscopy. In some embodiments, benefits may include detection benefits.

Returning to the example embodiment of FIG. 14B, Signal attenuation is the scale on the left and specific reference points for different frequencies are shown. Long 1452 has an attenuation of 10 decibels per 10 kilometers. Medium 1454 has an attenuation of 10 decibels per 1 kilometer. Indoor 1456 has an attenuation of 10 decibels per 100 meters. Near Field 1458 has an attenuation of 10 decibels per 1 meter. Attenuation Curve 1450 shows that frequencies between 1 THz and 3 THz have a high atmospheric absorption level. In some embodiments, Long 1452, Medium 1454, Indoor 1456, and Near Field 1458 may enable enhanced and/or distinguishable molecular fingerprints (not pictured). In some embodiments, Long 1452, Medium 1454, Indoor 1456, and Near Field 1458 may enable the ability to pass through human skin (not pictured). In some embodiments, the benefit of passing through human skin may include cancer detection (not pictured). In some embodiments, Long 1452, Medium 1454, Indoor 1456, and Near Field 1458 may enable may enhance radio coverage via reflected hypersurfaces (not pictured).

Figure 15:
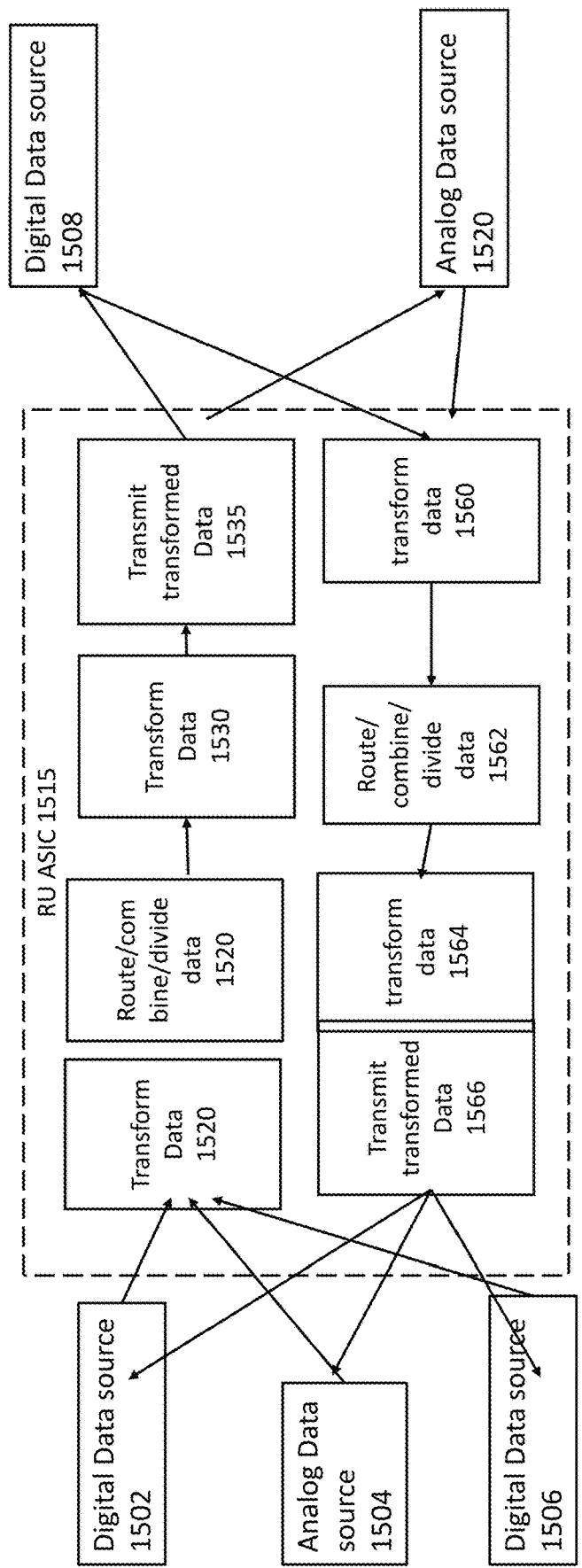
FIG. 15 illustrates simplified functioning of a RU ASIC, according to an embodiment of the current disclosure.

Refer now to the example embodiment of FIG. 15, which illustrates simplified functioning of a RU ASIC. RU ASIC 1515 receives data from digital data source 1502, analog data source 1504, and digital data source 1506. RU ASIC 1515 transforms the data to a common format 1520. Based on the output data sources of digital data source 1508 and 1610, RU ASIC 1515 routes/combines/divides the data based. RU ASIC 1515 transforms 1530 1535 the data to the appropriate data format for Digital data source 1508 and 1510. RU ASIC 1515 receives and transforms data 1560 digital data source 1508 and analog data source 1520. RU ASIC 151 routes/combines/divides data 1562 based on output data source for digital data sources 1502, analog data source 1504, and digital data source 1506. RU ASIC 1515 transforms data 1564 based on the appropriate output for the respective data. RU ASIC transmits the transformed data 1566 to digital data sources 1502, analog data source 1504, and digital data source 1506.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204/1304 and/or storage 1206/1306 can store data, software, code, instructions (e.g., processor instructions), logic, parameters, combinations thereof, and/or the like used for operations described herein. This includes memory element(s) 1204/1304 and/or storage 1206/1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mmWave, Ultra-Wideband (UWB), etc.), and/or wired communications (e.g., T1 lines, T3 lines, digital subscriber lines (DSL), Ethernet, Fiber Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A CMOS integrated circuit comprising:
digital-to-analogue converters (DACs);
analogue-to-digital converters (ADCs);
a digital signal processor (DSP);
on-chip switching;
an on-chip processor; and
logic enabling the CMOS integrated circuit to:
receive data from a plurality of data sources in a 5G network;
combine the data from the plurality of data sources into a single data stream;
encode the single data stream using the DSP; and
cause the encoded single data stream to be transmitted to another device in the 5G network,
wherein the transmission is over a transmission medium, and
wherein the transmission medium is chosen from the group consisting of an optical link, a mm Wave link, a radio link, and a SERDES link.

2. The CMOS integrated circuit of claim 1 wherein the logic further enables the CMOS integrated circuit to:
receive a data stream in a 5G network from the transmission medium;
decode the data stream;
divide the data stream into a plurality of divided data streams; and
cause each divided data stream to be transmitted to a respective data source of the plurality of data sources.

3. The CMOS integrated circuit of claim 2, wherein the plurality of data sources are respective antenna heads of an RU.

4. The CMOS integrated circuit of claim 2, wherein the CMOS integrated circuit causes the encoded single data stream to be transmitted to another device in the 5G network over millimeter wave transmissions over the mm Wave link, and
wherein the logic enables the CMOS integrated circuit to encode the data stream using complex modulation.

5. The CMOS integrated circuit of claim 2, wherein the data sources are millimeter wave transmissions, encoded using complex modulation, and wherein the logic enables the CMOS integrated circuit to:
convert the encoded data into a digital format;
combine the digitally converted encoded data; and
convert the combined digitally converted encoded data into a complex encoded signal.

6. The CMOS integrated circuit of claim 5, wherein the complex encoded signal is encoded on a light wave for transmission across the optical link using a complex modulation scheme such as QAM, and
wherein the CMOS integrated circuit further comprises 2 DACs and 2 ADCs per optical link.

7. The CMOS integrated circuit of claim 5, wherein the complex encoded signal is transmitted across the optical link using dual polarization, and
wherein the CMOS integrated circuit further comprises 4 DACs and 4 ADCs per optical link.

8. The CMOS integrated circuit of claim 5, wherein the complex encoded signal is transmitted across the optical link using intensity modulated signals such as PAM4, and
wherein the CMOS integrated circuit further comprises 1 DAC and 1 ADC per optical link.

9. The CMOS integrated circuit of claim 1, further comprising drivers for electrical-to-optical conversion.

10. The CMOS integrated circuit of claim 1, further comprising a receiver for optical signal detection comprising a Transimpedance Amplifier (TIA).

11. The CMOS integrated circuit of claim 1, further comprising an optical-to-electrical converter.

12. The CMOS integrated circuit of claim 4, wherein the logic enables the CMOS integrated circuit to encode the mm Wave transmission using a complex modulation scheme such as QAM,
wherein the encoding comprises an analogue conversion between baseband and mm Wave frequencies, and
wherein the CMOS integrated circuit comprises 2 DACs and 2 ADCs per mm Wave link.

13. The CMOS integrated circuit of claim 4, wherein a mm Wave signal is dual polarization, and
wherein the CMOS integrated circuit applies two times a number of ADCs or DACs per mm Wave link for dual polarization.

14. The CMOS integrated circuit of claim 4, further comprising forward error correction logic.

15. The CMOS integrated circuit of claim 5, wherein multiple optical links use intensity modulated signals, and
wherein the CMOS integrated circuit further comprises a multilevel driver to function as a DAC, and a multilevel slicer enabled to function as an ADC.

16. The CMOS integrated circuit of claim 1, wherein the logic enables the CMOS integrated circuit to cause the single data stream to be transmitted over two media to create redundancy in the transmitted encoded single data stream.

17. The CMOS integrated circuit of claim 2, wherein the logic enables the CMOS integrated circuit to cause the single data stream to be transmitted across different mm Wave bands to allow operation to continue with reduced data rates in an event of link degradation.

18. The CMOS integrated circuit of claim 2, wherein the logic enables the CMOS integrated circuit to switch the transmission medium during a transmission of the single data stream.

19. The CMOS integrated circuit of claim 15, wherein the intensity-modulated signals are modulated in a PAM4 encoding.

20. The CMOS integrated circuit of claim 15, wherein the multiple optical links are provided for redundancy.

21. A CMOS integrated circuit comprising:
digital-to-analogue converters (DACs);
analogue-to-digital converters (ADCs);
a digital signal processor (DSP);
on-chip switching;
an on-chip processor; and
logic enabling the CMOS integrated circuit to:
  receive data from one or more transmission media, wherein the transmission media are digital or analog transmission media;
  determine a mapping of the data received from the one or more transmission media according to one or more output transmission media, wherein the one or more output transmission media are digital transmission media or analog transmission media;
  transform the data received from the one or more transmission media according to the mapping for the one or more output transmission media; and
  cause the data to be transmitted by the one or more output transmission media, wherein the one or more transmission media is chosen from the group consisting of an optical link, an electrical link, a mm Wave link, a radio link, and a SERDES link.

* * * * *